US010033280B2

(12) United States Patent
Naito

(10) Patent No.: US 10,033,280 B2
(45) Date of Patent: Jul. 24, 2018

(54) VOLTAGE CONVERSION CIRCUIT, ELECTRONIC DEVICE, AND METHOD OF CONTROLLING VOLTAGE CONVERSION CIRCUIT

(71) Applicant: Sony Corporation, Tokyo (JP)

(72) Inventor: Takahiro Naito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/531,112

(22) PCT Filed: Oct. 7, 2015

(86) PCT No.: PCT/JP2015/078514
§ 371 (c)(1),
(2) Date: May 26, 2017

(87) PCT Pub. No.: WO2016/098425
PCT Pub. Date: Jun. 23, 2016

(65) Prior Publication Data
US 2017/0264200 A1   Sep. 14, 2017

(30) Foreign Application Priority Data

Dec. 19, 2014  (JP) .................. 2014-256874

(51) Int. Cl.
*H02M 1/32* (2007.01)
*H02M 3/158* (2006.01)
(Continued)

(52) U.S. Cl.
CPC ............. *H02M 3/158* (2013.01); *H02M 1/08* (2013.01); *H02M 1/32* (2013.01); *H02M 1/36* (2013.01); *H02M 2001/0048* (2013.01)

(58) Field of Classification Search
CPC .. H02M 2001/0048; H02M 1/08; H02M 1/36; H02M 3/158
See application file for complete search history.

(56) References Cited

U.S. PATENT DOCUMENTS

2004/0141341 A1*  7/2004  Higashitani ......... H02M 3/1582
                                                  363/59
2012/0091981 A1*  4/2012  Komiya ............... H02M 3/156
                                                  323/282
(Continued)

FOREIGN PATENT DOCUMENTS

JP    09-294368 A     11/1997
JP    2004-173421 A    6/2004
(Continued)

OTHER PUBLICATIONS

B. Sahu et al., "An Accurate, Low-Voltage, CMOS Switching Power Supply With Adaptive On-Time Pulse-Frequency Modulation (PFM) Control," IEEE Transactions on Circuits and Systems—I: Regular Papers, vol. 54, No. 2, Feb. 2007.

*Primary Examiner* — Jeffrey Gblende
*Assistant Examiner* — David A. Singh
(74) *Attorney, Agent, or Firm* — Michael Best & Friedrich LLP

(57) ABSTRACT

[Object] To reduce power consumption of a DC-DC converter.

[Solution] A voltage conversion circuit includes a voltage generation unit, a stop control unit, a current supply unit, and an intermittent control unit. The voltage generation unit generates an output voltage on the basis of a current when the current is supplied. The stop control unit outputs a signal for stopping the supply of the current. The current supply unit supplies the current to the voltage generation unit until the signal is output. The intermittent control unit operates the stop control unit during a supply period of the current and stops the stop control unit when the signal is output.

18 Claims, 18 Drawing Sheets

(51) Int. Cl.
*H02M 1/36* (2007.01)
*H02M 1/08* (2006.01)
H02M 1/00 (2006.01)

(56) References Cited

U.S. PATENT DOCUMENTS

| | | | | |
|---|---|---|---|---|
| 2013/0051088 A1* | 2/2013 | Yamashita | ............... | H02M 1/36 |
| | | | | 363/21.13 |
| 2013/0300397 A1* | 11/2013 | Kinjo | ..................... | H02M 3/24 |
| | | | | 323/358 |
| 2013/0334876 A1* | 12/2013 | Yamaguchi | ................ | G05F 1/10 |
| | | | | 307/9.1 |
| 2014/0071715 A1* | 3/2014 | Sato | .................. | H02M 3/33507 |
| | | | | 363/21.01 |
| 2016/0119992 A1* | 4/2016 | Tyrrell | ............... | H05B 33/0845 |
| | | | | 315/200 R |
| 2016/0149490 A1* | 5/2016 | Nakamura | ............ | H02M 3/158 |
| | | | | 323/271 |

FOREIGN PATENT DOCUMENTS

| JP | 2012-090384 A | 5/2012 |
|---|---|---|
| JP | 2014-108013 A | 6/2014 |

* cited by examiner

FIG. 5

| CONVERTER ENABLE SIGNAL EN | VOLTAGE REDUCTION DETECTION SIGNAL Vd | PMOS OFF TIMING DETECTION SIGNAL $P_{end}$ | PMOS CONTROL SIGNAL Pon |
|---|---|---|---|
| L | H/L | H/L | L |
| H | H | L | H |
| H | L | L | MAINTAINED |
| H | L | H | L |

FIG. 6

| CONVERTER ENABLE SIGNAL EN | PMOS OFF TIMING DETECTION SIGNAL $P_{end}$ | NMOS OFF TIMING DETECTION SIGNAL $N_{end}$ | NMOS CONTROL SIGNAL Non |
|---|---|---|---|
| L | H/L | H/L | L |
| H | H | L | H |
| H | L | L | MAINTAINED |
| H | L | H | L |

| CONVERTER ENABLE SIGNAL EN | OUTPUT ENABLE SIGNAL OEN | ACTIVATION ENABLE SIGNAL BEN |
|---|---|---|
| L | L | L |
| H | L | H |
| H | H | L |

FIG. 15

| CONVERTER ENABLE SIGNAL EN | ACTIVATION ENABLE SIGNAL BEN | VOLTAGE REDUCTION DETECTION SIGNAL Vd | PMOS OFF TIMING DETECTION SIGNAL P$_{end}$ | PMOS CONTROL SIGNAL Pon |
|---|---|---|---|---|
| L | H/L | H/L | H/L | L |
| H | H | H/L | H/L | H |
| H | L | H | | H |
| H | L | | L | MAINTAINED |
| H | L | L | | MAINTAINED |
| H | L | L | H | L |

FIG. 16

| CONVERTER ENABLE SIGNAL EN | ACTIVATION ENABLE SIGNAL BEN | PMOS TURN OFF CONTROL SIGNAL P_{end} | NMOS OFF TIMING DETECTION SIGNAL N_{end} | NMOS CONTROL SIGNAL Non |
|---|---|---|---|---|
| L | H/L | H/L | H/L | L |
| H | H | H/L | H/L | H |
| H | L | H | | H |
| H | L | | L | MAINTAINED |
| H | L | L | | MAINTAINED |
| H | L | L | H | L | ent technology relates to a voltage conversion
VOLTAGE CONVERSION CIRCUIT, ELECTRONIC DEVICE, AND METHOD OF CONTROLLING VOLTAGE CONVERSION CIRCUIT

TECHNICAL FIELD

The present technology relates to a voltage conversion circuit, an electronic device, and a method of controlling the voltage conversion circuit. Particularly, the present technology relates to a voltage conversion circuit using a switching element, an electronic device, and a method of controlling the voltage conversion circuit.

BACKGROUND ART

In the related art, direct current (DC)-DC converters are used in electronic devices to convert direct current power voltages into necessary direct current voltages of circuits or components inside the electronic devices. As types of DC-DC converters, for example, a linear type converter in which variation is cut by a semiconductor element and a switching type converter in which a switching element is turned on or off can be exemplified. Of these types, a switching type is often used since conversion efficiency is high.

As control of the switching type, pulse frequency modulation (PFM) control in which a frequency is controlled and pulse width modulation (PWM) control in which a pulse width is controlled can be exemplified. In the PWM control, irrespective of the size of a load, a certain switching loss occurs due to switching being performed at a certain frequency. In contrast, in the PFM control, as a load is smaller, a switching frequency decreases. Therefore, it is possible to reduce the switching loss with a light load. Therefore, the PFM control is often used with a light load (for example, see Non-Patent Literature 1).

CITATION LIST

Non-Patent Literature

Non-Patent Literature 1: Biranchinath Sahu, et al., "An Accurate, Low-Voltage, CMOS Switching Power Supply With Adaptive On-Time Pulse-Frequency Modulation (PFM) Control," IEEE TRANSACTIONS ON CIRCUITS AND SYSTEMS-1: REGULAR PAPERS, VOL. 54, NO. 2, FEBRUARY 2007

DISCLOSURE OF INVENTION

Technical Problem

In the DC-DC converter of the above-described PFM control, conversion efficiency becomes higher as a power loss in the DC-DC converter becomes smaller. Therefore, it is desirable to reduce the loss as much as possible. Here, regarding the loss of the DC-DC converter, there are a switching loss in a switching element and an inductor loss in a coil in addition to a loss caused due to power consumption of a control circuit performing switching control. Of these losses, the switching loss and the inductor loss can be reduced by performing the PFM control at a low switching frequency with a light load. However, since a control circuit has to operate normally during the switching control, it is difficult to reduce power consumption of the control circuit.

The present technology is devised in view of the foregoing circumstance and an object of the present technology is to reduce power consumption of a DC-DC converter.

Solution to Problem

The present technology has been achieved in order to solve the above problem, and a first aspect of the present technology is to provide a voltage conversion circuit including: a voltage generation unit configured to generate an output voltage on the basis of a current when the current is supplied; a stop control unit configured to output a signal for stopping the supply of the current; a current supply unit configured to supply the current to the voltage generation unit until the signal is output; and an intermittent control unit configured to operate the stop control unit during a supply period of the current and to stop the stop control unit when the signal is output, and a method of controlling the voltage conversion circuit. Thus, it is possible to obtain an operation effect in which the stop control unit is stopped when the signal is detected.

According to the first aspect, the voltage conversion circuit may further include a start timing detection unit configured to detect a start timing of the supply period, and the stop control unit may detect an end timing of the supply period and outputs the signal. Thus, it is possible to obtain an operation effect in which a comparison result between an output voltage and a predetermined reference voltage is fixed to a predetermined fixed value from the start timing to the end timing.

According to the first aspect, the start timing detection unit may include a voltage comparator that compares the output voltage to a predetermined reference voltage and outputs a comparison result as a start timing detection signal, and a detection signal control unit that fixes the comparison result to a predetermined fixed value until the starting timing is detected and the end timing is detected. Thus, it is possible to obtain an operation effect in which the comparison result between the output voltage and the predetermined reference voltage is fixed to the predetermined fixed value from the start timing to the end timing.

According to the first aspect, the stop control unit may detect a time at which a predetermined period has elapsed from the start timing as the end timing. Thus, it is possible to obtain an operation effect in which elapse of the predetermined period from the start timing is detected as the end timing.

According to the first aspect, the stop control unit may detect a time at which the current reaches a predetermined peak value as the end timing. Thus, it is possible to obtain an operation effect in which the end timing is detected when the current reaches the predetermined peak value.

According to the first aspect, the stop control unit may include a current comparator that compares the current to the predetermined peak value and outputs a comparison result as the signal, and a detection signal mask unit that masks the signal until a certain mask period elapses from the start timing. Thus, it is possible to obtain an operation effect in which the signal is masked until the certain mask period elapses from the start timing.

According to the first aspect, the voltage conversion circuit may further include a backward flow prevention unit configured to prevent backward flow of the current. Thus, it is possible to obtain an operation effect in which the backward flow of the current is prevented.

According to the first aspect, the voltage conversion circuit may further include a current reduction timing detection unit configured to start detecting a current reduction timing at which the current is lower than a predetermined set value when the signal is output. The backward flow prevention unit may control a path between the voltage generation unit and a ground terminal to a closed state when the signal is output, and the backward flow prevention unit controls the path to an open state when the current reduction timing is detected, and the intermittent control unit may control the current reduction timing detection unit such that the detection of the current reduction timing is stopped when the current reduction timing is detected. Thus, it is possible to obtain an operation effect in which the detection of the current reduction timing by the current reduction timing detection unit is stopped when the signal is output.

According to the first aspect, the voltage conversion circuit may further include: an activation control unit configured to control and operate the stop control unit over a predetermined preparation period after an instruction to start generating the output voltage is given. Thus, it is possible to obtain an operation effect in which the end timing detection unit operates over the predetermined preparation period.

According to the first aspect, the start timing detection unit may include a voltage comparator that compares the output voltage to a predetermined reference voltage and outputs a comparison result as a start timing detection signal, and a detection signal control unit that fixes the comparison result to a predetermined fixed value until the starting timing is detected and the end timing is detected. Thus, it is possible to obtain an operation effect in which the comparison result between the output voltage and the predetermined reference voltage is fixed to the predetermined fixed value from the start timing to the end timing.

According to a second aspect of the present technology, there is provided an electronic device including: a voltage conversion circuit configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit that operates the stop control unit during a supply period of the current and stops the stop control unit when the signal is output; and a processing circuit configured to perform a process of controlling the output voltage. Thus, it is possible to obtain an operation effect in which the stop control unit is stopped when the signal is detected.

According to a third aspect of the present technology, there is provided an electronic device including: a plurality of voltage conversion circuits each configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit an intermittent control unit that operates the stop control unit during a supply period of the current and stops the stop control unit when the signal is output; and a processing circuit configured to perform a process of controlling the output voltage of each of the plurality of voltage conversion circuits. Thus, it is possible to obtain an operation effect in which the end timing detection unit is stopped when the end timing is detected in each of the plurality of voltage conversion circuits.

Advantageous Effects of Invention

According to the present technology, it is possible to obtain the advantageous effect of reducing power consumption of the DC-DC converter. In addition, the advantageous effects described here are not necessarily limited and any advantageous effects described in the present disclosure may be obtained.

BRIEF DESCRIPTION OF DRAWINGS

FIG. 5 is a diagram illustrating an example of an operation of controlling a P-type MOS transistor of the converter control unit according to the first embodiment.

FIG. 6 is a diagram illustrating an example of an operation of controlling an N-type MOS transistor of the converter control unit according to the first embodiment.

FIG. 15 is a diagram illustrating an example of an operation of controlling a P-type MOS transistor of a converter control unit according to the second embodiment.

FIG. 16 is a diagram illustrating an example of an operation of controlling an N-type MOS transistor of the converter control unit according to the second embodiment.

MODE(S) FOR CARRYING OUT THE INVENTION

Hereinafter, modes for carrying out the present technology (hereinafter referred to as embodiments) will be described. The description will be made in the following order.
1. First embodiment (example in which intermittent control of timing detection unit is performed)
2. Second embodiment (example in which intermittent control of timing detection unit is performed after activation control)
3. Third embodiment (example in which an erroneous operation of voltage reduction detection unit is prevented and intermittent control of timing detection unit is performed)
4. Fourth embodiment (example in which backward flow is prevented by diode and intermittent control of timing detection unit is performed)
5. Fifth embodiment (example in which intermittent control of timing detection unit including comparator is performed)
6. Sixth embodiment (example in which intermittent control of timing detection unit is performed in each of plurality of converters)

1. First Embodiment

[Configuration Example of Information Processing Device]

Figure 1:
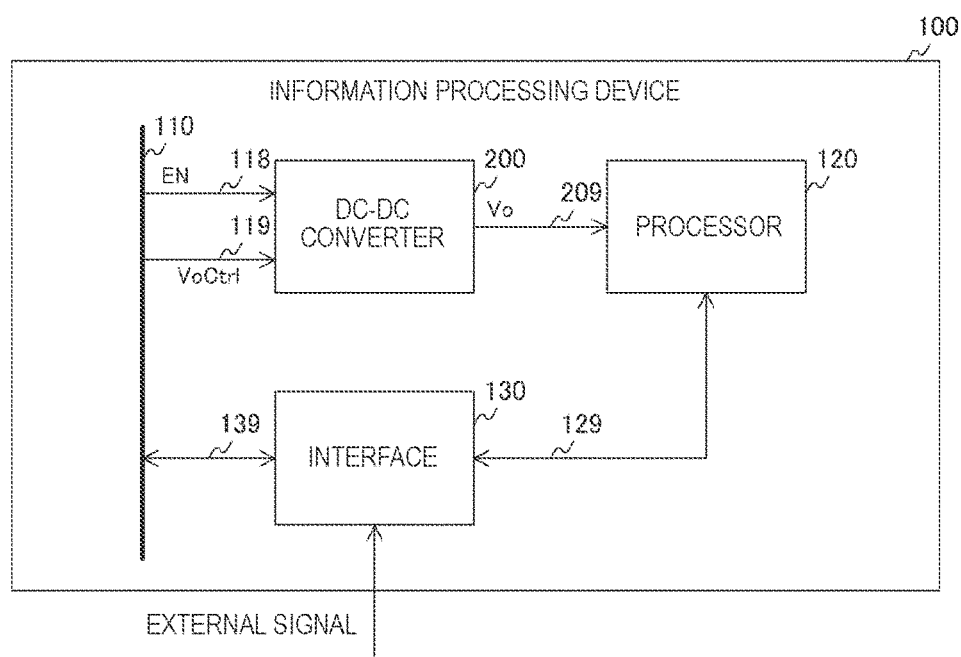
FIG. 1 is a block diagram illustrating a configuration example of an information processing device according to a first embodiment.

FIG. 1 is a block diagram illustrating a configuration example of an information processing device 100 according to a first embodiment. The information processing device 100 includes a bus 110, a processor 120, an interface 130, and a DC-DC converter 200.

The processor 120 controls the entire information processing device 100. The processor 120 receives an external signal via an interface. For example, a converter enable signal EN or a signal for instructing the processor 120 to perform calculation is input as the external signal. The processor 120 performs the calculation in accordance with the external signal. Then, the processor 120 generates a voltage control signal VoCtrl and supplies the voltage control signal VoCtrl to the DC-DC converter 200 via the interface 130. The processor 120 is an example of a processing circuit described in the claims.

Here, the voltage control signal VoCtrl is a signal for controlling a value of an output voltage Vo of the DC-DC converter 200. In general, when a power voltage (that is, output voltage Vo) of the processor 120 is set to be high, power consumption increases, but a calculation processing speed can be raised. Conversely, when the power voltage is set to be low, power consumption decreases, but the calculation processing speed is lowered. Therefore, the processor 120 controls the power voltage by the voltage control signal VoCtrl in accordance with the obtained calculation processing speed.

Also, the converter enable signal EN is a signal for controlling the DC-DC converter 200 such that the DC-DC converter 200 is enabled or disabled. For example, the converter enable signal EN is set to a high level when the DC-DC converter 200 is controlled such that the DC-DC converter 200 is enabled, and is set to a low level when the DC-DC converter 200 is controlled such that the DC-DC converter 200 is disabled. For example, when the processor 120 is caused to start calculation, the converter enable signal EN at the high level (enable) is input from the outside.

The interface 130 exchanges the external signal, the voltage control signal VoCtrl, the converter enable signal EN, and the like with an external device, the processor 120, and the bus 110. The bus 110 exchanges the voltage control signal VoCtrl, the converter enable signal EN, and the like between the interface 130 and the DC-DC converter 200.

The DC-DC converter 200 converts a direct current voltage. The DC-DC converter 200 receives the converter enable signal EN and the voltage control signal VoCtrl from the bus 110 via signal lines 118 and 119. When the converter enable signal EN is set to the high level (enable), the DC-DC converter 200 converts the direct current voltage into a direct current output voltage Vo in accordance with the voltage control signal VoCtrl. Then, the DC-DC converter 200 supplies the output voltage Vo to the processor 120 via a power line 209. In addition, the DC-DC converter 200 is an example of a voltage conversion device described in the claims.

In addition, the DC-DC converter 200 is included in the information processing device 100, but the DC-DC converter 200 may be included in an electronic device other than the information processing device. Also, the information processing device 100 is an example of an electronic device described in the claims.

[Configuration Example of DC-DC Converter]

Figure 2:
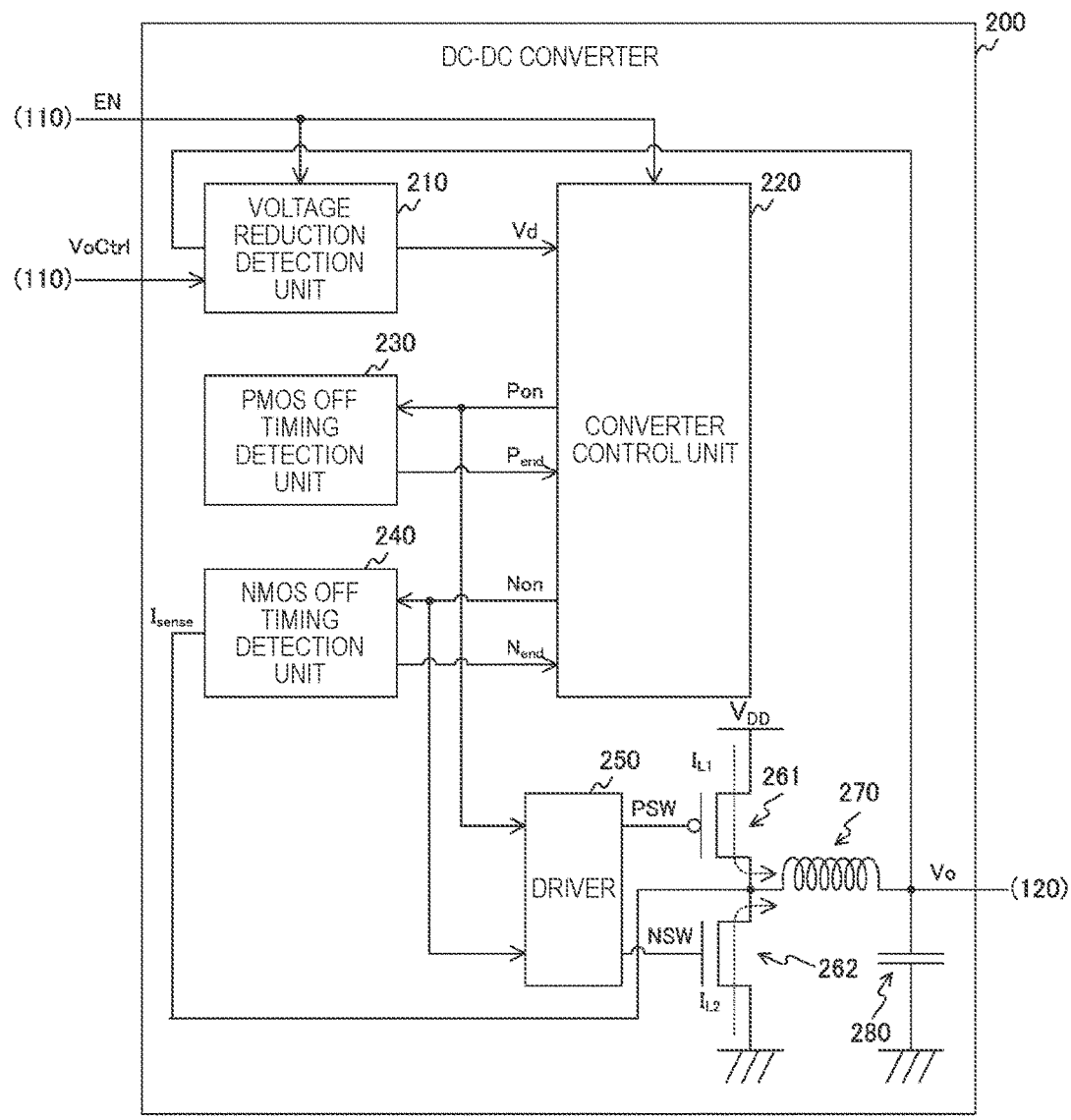
FIG. 2 is a block diagram illustrating a configuration example of a DC-DC converter according to the first embodiment.

FIG. 2 is a block diagram illustrating a configuration example of a DC-DC converter 200 according to the first embodiment. The DC-DC converter 200 includes a voltage reduction detection unit 210, a converter control unit 220, a PMOS OFF timing detection unit 230, an NMOS OFF timing detection unit 240, and a driver 250. Also, the DC-DC converter 200 further includes a P type MOS transistor 261, an N type MOS transistor 262, a coil 270, and a capacitor 280.

In the P type MOS transistor 261, a gate is connected to the driver 250, a power voltage $V_{DD}$ is applied to a source, and a drain is connected to the coil 270. Also, in the N type MOS transistor 262, a gate is connected to the driver 250, a drain is connected to the P type MOS transistor 261, the coil 270, and the NMOS OFF timing detection unit 240, and a source is connected to a ground terminal. One end of the coil 270 is connected to the P type MOS transistor 261 and the N type MOS transistor 262 and the other end of the coil 270 is connected to the capacitor 280, the processor 120, and the voltage reduction detection unit 210.

The P type MOS transistor 261 opens and closes a path between a power supply and the coil 270 under the control of the driver 250. Also, the N type MOS transistor 262 opens and closes a path between the ground terminal and the coil 270 under the control of the driver 250. These transistors are not controlled such that these transistors simultaneously enter an ON state and are exclusively controlled such that both these transistors enter an OFF state or only one of these transistors enters the ON state. This is because when both the P type MOS transistor 261 and the N type MOS transistor 262 enter the ON state, the power supply and the ground terminal may be short-circuited by these transistors and a relatively large current may flows.

When control is performed by the driver 250 such that the P type MOS transistor 261 enters the ON state, a current $I_{L1}$ is supplied to the coil 270 in accordance with the power voltage $V_{DD}$. When the current $I_{L1}$ is supplied, the coil 270 generates an output voltage Vo by self-induction. The capacitor 280 smoothes the output voltage Vo. In addition, the P type MOS transistor 261 is an example of a current supply unit described in the claims. Also, the coil 270 and the capacitor 280 are examples of a voltage generation unit described in the claims.

Conversely, when the P type MOS transistor 261 is controlled by the driver 250 such that the P type MOS transistor 261 enters the OFF state, the N type MOS transistor 262 is controlled such that the N type MOS transistor 262 enters the ON state. Thus, a current $I_{L2}$ in accordance with the output voltage Vo flows to the coil 270, and thus a current value of the current $I_{L2}$ gradually decreases. At a timing at which the current $I_{L2}$ is reduced to a value equal to or less than "0" milliamperes (mA), the N type MOS transistor 262 is controlled such that the N type MOS transistor 262 enters the OFF state, and thus backward flow is prevented.

In addition, the P type MOS transistor 261 and the N type MOS transistor 262 are installed as switching elements, but the present technology is not limited to this configuration. For example, instead of the MOS transistor, a thyristor or the like may be installed as the switching element.

The voltage reduction detection unit 210 detects whether the output voltage Vo is reduced to a voltage less than a reference voltage $V_{REF}$. When the converter enable signal EN is at a high level (enable), the voltage reduction detection unit 210 generates the reference voltage $V_{REF}$ in accordance with the voltage control signal VoCtrl and compares the reference voltage $V_{REF}$ to the output voltage Vo. The voltage reduction detection unit 210 supplies a comparison result as a voltage reduction detection signal Vd to the converter control unit 220. Conversely, when the converter enable signal EN is at a low level (disable), the voltage reduction detection unit 210 stops the operation and does not detect voltage reduction. Here, a timing at which the output voltage Vo is reduced to a voltage less than the reference voltage $V_{REF}$ is treated as a start timing at which a current starts to be supplied to the coil 270. In addition, the voltage reduction detection unit 210 is an example of a start timing detection unit described in the claims.

The converter control unit 220 controls the entire DC-DC converter 200. The converter control unit 220 generates a PMOS control signal Pon and an NMOS control signal Non on the basis of the voltage reduction detection signal Vd, a PMOS OFF timing detection signal $P_{end}$, and an NMOS OFF timing detection signal $N_{end}$. The converter control unit 220 supplies the PMOS control signal Pon to the PMOS OFF timing detection unit 230 and the driver 250 and supplies the NMOS control signal Non to the NMOS OFF timing detection unit 240 and the driver 250.

Here, the PMOS OFF timing detection signal $P_{end}$ is a signal indicating an end timing at which the P type MOS transistor is turned off to end the supply of power to the coil 270. The NMOS OFF timing detection signal $N_{end}$ is a signal indicating a current reduction timing at which a current from the coil 270 is reduced to a value equal to or less "0" milliamperes (mA). Also, the PMOS control signal Pon is a signal for controlling the P type MOS transistor 261 such that the P type MOS transistor 261 enters the ON state or the OFF state. For example, when the P type MOS transistor 261 enters the ON state, a high level is set in the PMOS control signal Pon. When the P type MOS transistor 261 enters the OFF state, a low level is set in the PMOS control signal Pon. The NMOS control signal Non is a signal for controlling the N type MOS transistor 262 such that the N type MOS transistor 262 enters the ON state or the OFF state. For example, when the N type MOS transistor 262 enters the ON state, a high level is set in the NMOS control signal Non. When the N type MOS transistor 262 enters the OFF state, a low level is set in the NMOS control signal Non.

The converter control unit 220 sets the high level in the PMOS control signal at a start timing indicated by the voltage reduction detection signal Vd. Thus, the P type MOS transistor 261 enters the On state and a current starts to be supplied to the coil 270. Then, at an end timing indicated by the PMOS OFF timing detection signal $P_{end}$, the converter control unit 220 sets the low level in the PMOS control signal and sets the high level in the NMOS control signal. Thus, the P type MOS transistor 261 enters the OFF state and the supply of the current to the coil 270 ends. Then, at a timing indicated by the NMOS OFF timing detection signal $N_{end}$, the converter control unit 220 sets the low level in the NMOS control signal. Thus, the N type MOS transistor 262 enters the OFF state, and thus backward flow of the current is prevented. In addition, the converter control unit 220 is an example of an intermittent control unit described in the claims.

In this way, the P type MOS transistor 261 and the N type MOS transistor 262 are repeatedly turned on and off. A frequency at which these transistors are switched is controlled in accordance with the magnitude of a load current of the processor 120 or the like. That is, the converter control unit 220 performs PFM control. In addition, the converter control unit 220 may perform PWM control instead of the PFM control.

The PMOS OFF timing detection unit 230 detects a PMOS OFF timing (that is, a current supply end timing) at which the P type MOS transistor 261 enters the OFF state. The PMOS OFF timing detection unit 230 detects a timing at which the PMOS control signal enters the high level after a certain period has elapsed as a PMOS OFF timing (end timing). When the PMOS OFF timing detection unit 230 detects the PMOS OFF timing, the PMOS OFF timing detection unit 230 generates the PMOS OFF timing detection signal $P_{end}$ and supplies the PMOS OFF timing detection signal $P_{end}$ to the converter control unit 220. In addition, the PMOS OFF an timing detection unit 230 is example of a stop control unit described in the claims.

The NMOS OFF timing detection unit 240 detects an NMOS OFF timing at which the N type MOS transistor 262 enters the OFF state. Referring to the current $I_{L2}$ when the N type MOS transistor 262 is in the On state, the NMOS OFF timing detection unit 240 detects a current reduction timing at which the value of the current $I_{L2}$ is reduced to a value equal to or less than "0" milliamperes (mA) as the NMOS OFF timing. When the PMOS OFF timing detection unit 230 detects the NMOS OFF timing (current reduction timing), the PMOS OFF timing detection unit 230 generates the NMOS OFF timing detection signal $N_{end}$ and supplies the NMOS OFF timing detection signal $N_{end}$ to the converter control unit 220. In addition, the NMOS OFF timing detection unit 240 is an example of a current reduction timing detection unit described in the claims.

The driver 250 controls the P type MOS transistor 261 and the N type MOS transistor 262. The driver 250 inverts the PMOS control signal Pon and supplies the inverted PMOS control signal Pon as a driver output signal PSW to the P type MOS transistor 261. Also, the driver 250 supplies the NMOS control signal Non as a driver output signal NSW to the N type MOS transistor 262. Here, the driver 250 generates the driver output signals so that both the P type MOS transistor 261 and the N type MOS transistor 262 do not enter the ON state. That is, these signals are generated so that the driver output signal PSW does not enter the low level and the driver output signal NSW does not enter the high level.

[Configuration Example of Voltage Reduction Detection Unit]

Figure 3:
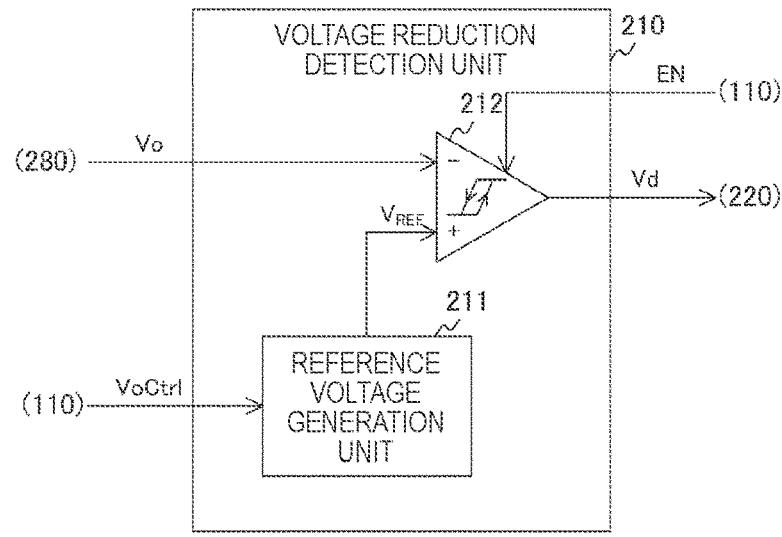
FIG. 3 is a block diagram illustrating a configuration example of a voltage reduction detection unit according to the first embodiment.

FIG. 3 is a block diagram illustrating a configuration example of the voltage reduction detection unit 210 according to the first embodiment. The voltage reduction detection unit 210 includes a reference voltage generation unit 211 and a comparator 212.

The reference voltage generation unit 211 generates the certain reference voltage $V_{REF}$ in accordance with the voltage control signal VoCtrl. The reference voltage generation unit 211 supplies the reference voltage $V_{REF}$ to a non-inversion input terminal (+) of the comparator 212.

The comparator 212 compares the output voltage Vo to the reference voltage $V_{REF}$. The output voltage Vo is input to an inversion input terminal (−) of the comparator 212 and the reference voltage $V_{REF}$ is input to the non-inversion input terminal (+). Also, the converter enable signal EN is input to an enable terminal of the comparator 212. When the converter enable signal EN is at the high level, the comparator 212 supplies a comparison result between the output voltage Vo and the reference voltage $V_{REF}$ as the voltage detection signal Vd to the converter control unit 220. In addition, the comparator 212 is an example of a voltage comparator described in the claims.

[Configuration Example of Converter Control Unit]

Figure 4:
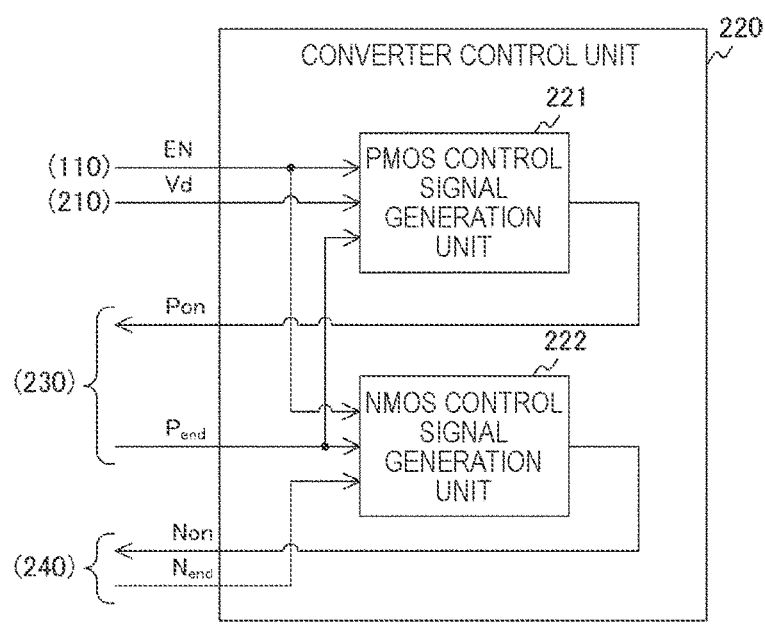
FIG. 4 is a block diagram illustrating a configuration example of a converter control unit according to the first embodiment.

FIG. 4 is a block diagram illustrating a configuration example of the converter control unit 220 according to the first embodiment. The converter control unit 220 includes a PMOS control signal generation unit 221 and an NMOS control signal generation unit 222.

The PMOS control signal generation unit 221 generates the PMOS control signal Pon. An initial state of the PMOS control signal Pon is set to, for example, the low level. When the converter enable signal EN is in the high level (enable) state and the voltage detection signal Vd enters the high level, the PMOS control signal generation unit 221 sets the PMOS control signal Pon to the high level. Also, when the converter enable signal EN is at the high level and the voltage detection signal Vd and the PMOS OFF timing detection signal $P_{end}$ are at the low level, the PMOS control signal generation unit 221 maintains the value of the PMOS control signal Pon. When the converter enable signal EN is in the high level state and the PMOS OFF timing detection signal $P_{end}$ enters the high level, the PMOS control signal generation unit 221 sets the low level in the PMOS control signal Pon.

The NMOS control signal generation unit 222 generates the NMOS control signal Non. An initial state of the NMOS control signal is set to, for example, the low level. When the converter enable signal EN is in the high level (enable) state and the PMOS OFF timing detection signal $P_{end}$ enters the high level, the NMOS control signal generation unit 222 sets the high level in the NMOS control signal Non. Also, when the converter enable signal EN is at the high level and the PMOS OFF timing detection signal $P_{end}$ and the NMOS OFF timing detection signal $N_{end}$ are at the low level, the NMOS control signal generation unit 222 maintains the value of the NMOS control signal Non. When the converter enable signal EN is in the high level state and the NMOS OFF timing detection signal $N_{end}$ enters the high level, the NMOS control signal generation unit 222 sets the low level in the NMOS control signal Non.

FIG. 5 is a diagram illustrating an example of an operation of controlling the P-type MOS transistor 261 of the converter control unit 220 according to the first embodiment. When the converter enable signal EN is at the low level (disable), the PMOS control signal Pon is controlled such that the PMOS control signal Pon is at the low level. Also, when the converter enable signal EN is at the high level (enable), the voltage reduction detection signal Vd is at the high level, and the PMOS OFF timing detection signal $P_{end}$ is at the low level, the PMOS control signal Pon is controlled such that the PMOS control signal Pon is at the high level. Also, when the converter enable signal EN is at the high level and the voltage reduction detection signal Vd and the PMOS OFF timing detection signal $P_{end}$ are at the low level, the value of the PMOS control signal Pon is maintained. When the converter enable signal EN is at the high level, the voltage reduction detection signal Vd is at the low level, and the PMOS OFF timing detection signal $P_{end}$ is at the high level, the PMOS control signal Pon is controlled such that the PMOS control signal Pon enters the low level.

FIG. 6 is a diagram illustrating an example of an operation of controlling the N-type MOS transistor 262 of the converter control unit 220 according to the first embodiment. When the converter enable signal EN is at the low level (disable), the NMOS control signal Non is controlled such that the NMOS control signal Non enters the low level. Also, when the converter enable signal EN is at the high level (enable), the PMOS OFF timing detection signal $P_{end}$ is at the high level, and the NMOS OFF timing detection signal $N_{end}$ is at the low level, the NMOS control signal Non is controlled such that the NMOS control signal Non enters the high level. Also, when the converter enable signal EN is at the high level and the PMOS OFF timing detection signal $P_{end}$ and the NMOS OFF timing detection signal $N_{end}$ are at the low level, the value of the NMOS control signal Non is maintained. When the converter enable signal EN is at the high level, the PMOS OFF timing detection signal $P_{end}$ is at the low level, and the NMOS OFF timing detection signal $N_{end}$ is at the high level, the NMOS control signal Non is controlled such that the NMOS control signal Non enters the low level.

[Configuration Example of PMOS OFF Timing Detection Unit]

Figure 7:
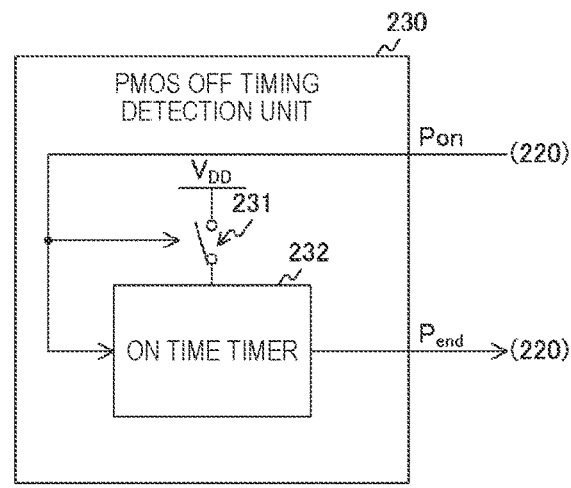
FIG. 7 is a block diagram illustrating a configuration example of a PMOS OFF timing detection unit according to the first embodiment.

FIG. 7 is a block diagram illustrating a configuration example of the PMOS OFF timing detection unit 230 according to the first embodiment. The PMOS OFF timing detection unit 230 includes a switch 231 and an ON time timer 232.

The switch 231 supplies the power voltage $V_{DD}$ to the ON time timer 232 in accordance with the PMOS control signal Pon. For example, when the PMOS control signal Pon is at the high level, the switch 231 supplies the power voltage $V_{DD}$. When the power voltage $V_{DD}$ is supplied, the ON time timer 232 operates. Conversely, when the PMOS control signal Pon is at the low level, the switch 231 does not supply the power voltage $V_{DD}$ and the ON time timer 232 stops. In this way, the PMOS control signal Pon is used as an enable signal not only for ON and OFF control of the P type MOS transistor 261 but also for controlling whether to operate the PMOS OFF timing detection unit 230.

In addition, the switch 231 is installed outside of the ON time timer 232, but the switch 231 may be installed inside the ON time timer 232. Also, the PMOS control signal Pon is used as the enable signal of the PMOS OFF timing detection unit 230, but the converter control unit 220 may generate the enable signal separately from the PMOS control signal Pon.

The ON time timer 232 measures a time at which the P type MOS transistor 261 is turned on. For example, an analog circuit described in FIG. 5 of Non-Patent Literature 1 is used as a circuit of the ON time timer 232. The On time timer 232 starts measuring a time, for example, when the PMOS control signal Pon enters the high level. When a time $t_{pON}$ indicated in the following equation elapses, the PMOS OFF timing detection signal $P_{end}$ is output over a certain pulse period.

$$t_{pON}=(L \times I_{Lpk})/(V_{DD}-V_O) \qquad \text{Equation 1}$$

In the foregoing equation, L is an inductance of the coil 270 and a unit of the inductance is, for example, henries (H). Also, $I_{Lpk}$ is a value set in advance as a peak value of a current supplied to the coil 270 and a unit of the value is, for example, milliamperes (mA).

[Configuration Example of NMOS OFF Timing Detection Unit]

Figure 8:
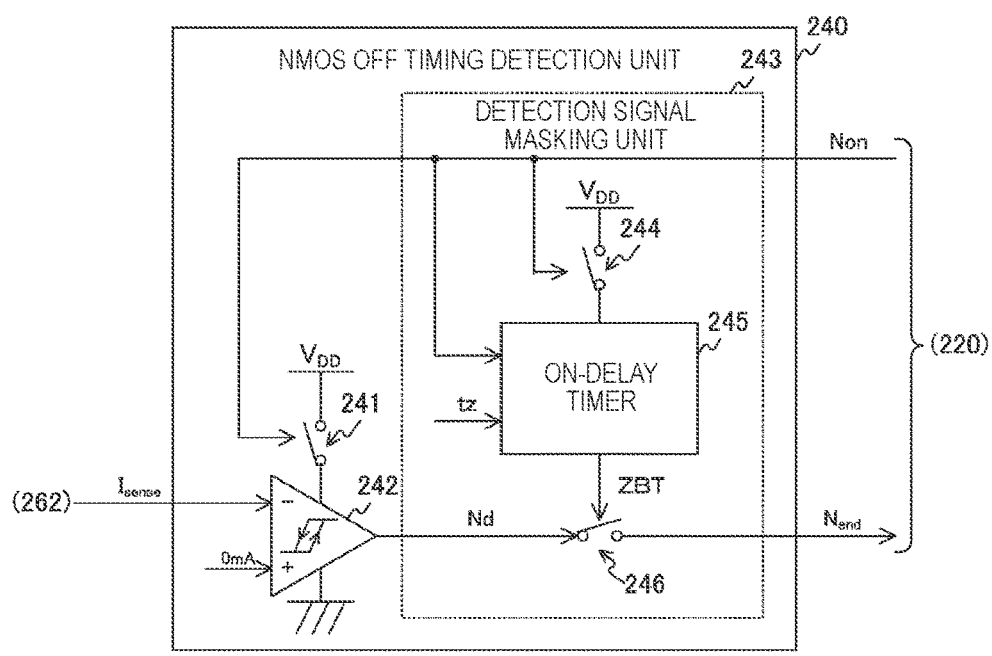
FIG. 8 is a block diagram illustrating a configuration example of an NMOS OFF timing detection unit according to the first embodiment.

FIG. 8 is a block diagram illustrating a configuration example of the NMOS OFF timing detection unit 240 according to the first embodiment. The NMOS OFF timing detection unit 240 includes a switch 241, a comparator 242, and a detection signal mask unit 243. The detection signal mask unit 243 includes a switch 244, an on-delay timer 245, and a switch 246.

The switch 241 supplies the power voltage $V_{DD}$ to the comparator 242 in accordance with the NMOS control signal Non. For example, when the NMOS control signal Non is at the high level, the switch 241 supplies the power voltage $V_{DD}$. When the power voltage $V_{DD}$ is supplied, the comparator 242 operates. Conversely, when the NMOS control signal Non is at the low level, the switch 241 does not supply the power voltage $V_{DD}$. Then, the comparator 242 stops.

The switch 244 supplies the power voltage $V_{DD}$ to the on-delay timer 245 in accordance with the NMOS control signal Non. For example, when the NMOS control signal Non is at the high level, the switch 241 supplies the power voltage $V_{DD}$. When the power voltage $V_{DD}$ is supplied, the on-delay timer 245 operates. Conversely, when the NMOS control signal Non is at the low level, the switch 244 does not supply the power voltage $V_{DD}$. Then, the on-delay timer 245 stops.

In this way, the NMOS control signal Non is used as an enable signal not only for ON and OFF control of the N type MOS transistor 262 but also for controlling whether to operate the NMOS OFF timing detection unit 240.

In addition, the switch 241 is installed outside of the comparator 242, but the switch 241 may be installed inside the comparator 242. Similarly, the switch 244 may also be installed inside the on-delay timer 245. Also, the NMOS control signal Non is used as the enable signal of the NMOS OFF timing detection unit 240, but the converter control unit 220 may generate the enable signal separately from the NMOS control signal Non.

The comparator 242 compares a current $I_{sense}$ flowing in the coil 270 to a predetermined value (for example, "0" milliamperes). The current $I_{sense}$ is input to an inversion input terminal (−) of the comparator 242 and "0" milliamperes (mA) is input to a non-inversion input terminal (+). The comparator 242 supplies a result obtained by comparing the current to the predetermined value as an NMOS OFF timing detection signal $N_{end}$ to the switch 246. In addition, the comparator 242 is an example of a current comparator described in the claims.

Here, when a zero current is detected by the comparator 242, the N type MOS transistor 262 is controlled such that the N type MOS transistor 262 enters the OFF state, and thus an on-time $t_{nON}$ of this transistor is obtained by the following equation.

$$t_{nON}=(L \times I_{Lpk})/Vo \qquad \text{Equation 2}$$

A switching frequency $f_{SW}$ is obtained by the following equation on the basis of Equations 1 and 2.

$$f_{SW}=2Io \times Vo \times (V_{DD}-Vo)/(L \times I_{Lpk}^2 \times V_{DD})=1/T_{sw} \qquad \text{Equation 3}$$

In the foregoing equation, Io is a load current of a load such as the processor 120 and a unit of the load current is milliampere (mA). $T_{sw}$ is a switching period and a unit of the switching period is, for example, seconds (s). Also, the unit of the switching frequency $f_{SW}$ is, for example, hertzs (H).

In Equation 3, the switching frequency $f_{SW}$ is controlled such that the switching frequency $f_{SW}$ has a value in accordance with the load current Io. That is, a voltage is converted by the PFM control.

In addition, the zero current is detected by the comparator 242, but a timer measuring the ON time $t_{nON}$ in Equation 2 may be installed instead of the comparator 242. In the case of this configuration, the timer may measure the time when the NMOS control signal Non enters the high level, and may output the NMOS OFF timing detection signal $N_{end}$ when $t_{nON}$ elapses.

The on-delay timer 245 supplies a signal obtained by delaying start of the NMOS control signal Non over a certain mask period tz as a mask period control signal ZBT to the switch 246. Here, the mask period control signal ZBT is used as a signal for controlling a mask period tz in which the NMOS OFF timing detection signal $N_{end}$ is masked. For example, when the NMOS OFF timing detection signal $N_{end}$ is masked, a low level is set in the mask period control signal ZBT. When the NMOS OFF timing detection signal $N_{end}$ is not masked, a high level is set in the mask period control signal ZBT.

The switch 246 opens and closes a path between the comparator 242 and the converter control unit 220 in accordance with the mask period control signal ZBT. When the mask period control signal ZBT is at the high level, the switch 246 transitions to a closed state. When the mask period control signal ZBT is at the low level, the switch 246 transitions to an open state. In a period in which the switch 246 is in the closed state, the NMOS OFF timing detection signal $N_{end}$ is output to the converter control unit 220 when the NMOS OFF timing detection signal $N_{end}$ is generated by the comparator 242. Conversely, in a period in which the switch 246 is in the open state, the NMOS OFF timing detection signal $N_{end}$ is masked and is not output to the converter control unit 220.

In this way, the NMOS control signal Non enters the high level and the NMOS OFF timing detection signal $N_{end}$ is masked over the mask period tz by the detection signal mask unit 243. Because of this mask control, an erroneous operation caused due to an intermittent operation of the NMOS OFF timing detection unit 240 can be suppressed.

Specifically, immediately after the comparator 242 is enabled, there is a concern of the comparator 242 performing an erroneous operation. Also, when the N type MOS transistor 262 is switched, a spike voltage or a spike current occurs in an LX terminal connecting the coil 270 to the driver 250, and thus there is a concern of the NMOS OFF timing detection signal $N_{end}$ being erroneously detected due to the spike voltage or the spike current caused due to a parasitic element. However, the detection signal mask unit 243 can prevent a detection signal at the time of the erroneous operation or the erroneous detection from being output to the converter control unit 220 by masking the NMOS OFF timing detection signal $N_{end}$. Thus, the operation of the DC-DC converter 200 becomes stable. In addition, when there is no concern of the erroneous operation or the erroneous detection occurring, the detection signal mask unit 243 may not be installed.

[Operation Example of DC-DC Converter]

Figure 9:
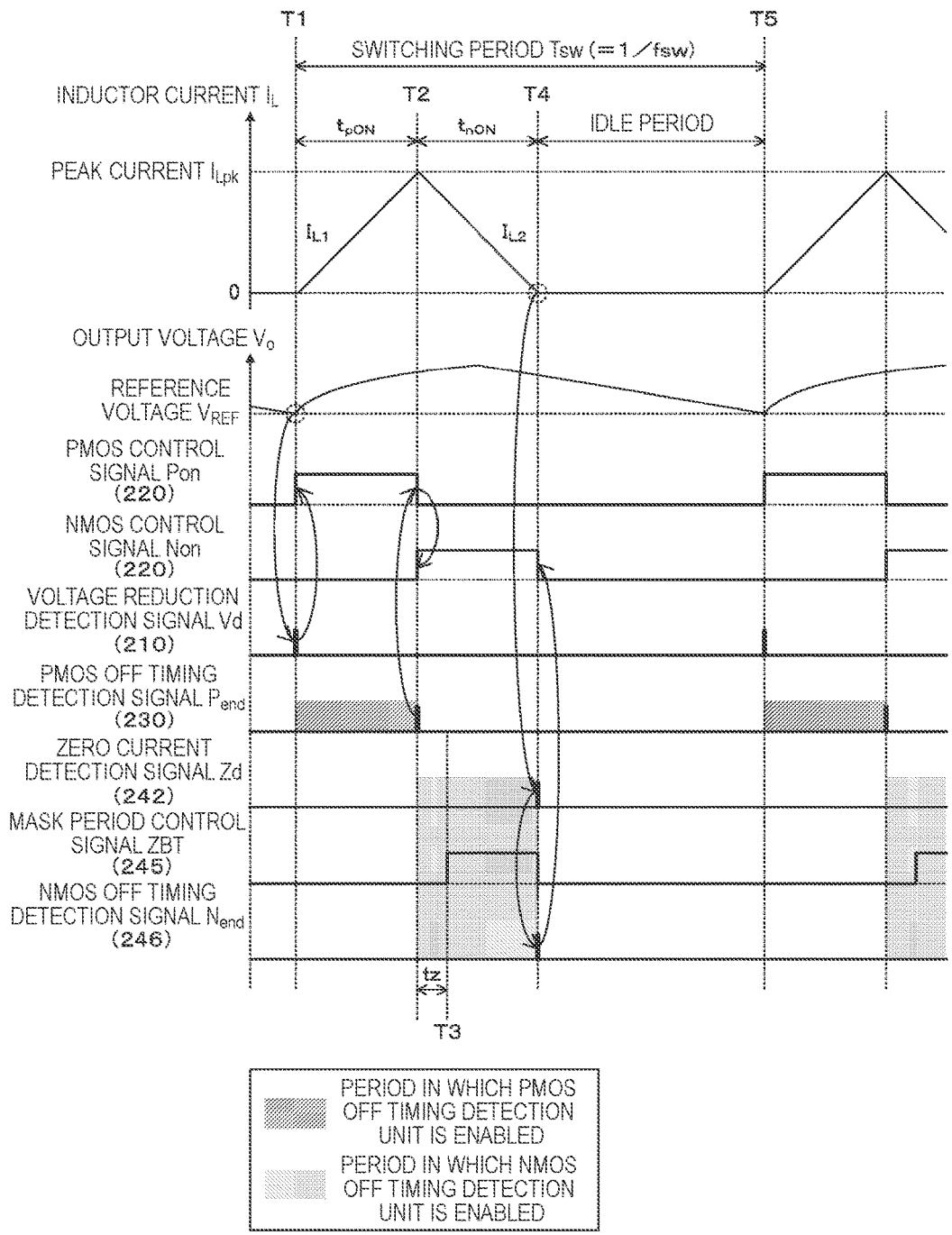
FIG. 9 is a timing chart illustrating an example of an operation of the DC-DC converter according to the first embodiment.

FIG. 9 is a timing chart illustrating an example of an operation of the DC-DC converter 200 according to the first embodiment. At a timing T1, when the output voltage Vo is lower than the reference voltage $V_{REF}$, the voltage reduction detection unit 210 outputs the voltage reduction detection signal Vd with the high level. When the voltage reduction detection signal Vd enters the high level, the converter control unit 220 controls the PMOS control signal Pon such that the PMOS control signal Pon is at the high level. The PMOS control signal Pon with the high level causes the P type MOS transistor 261 to transition to the ON state, and thus the output voltage Vo increases. Thus, the output voltage Vo becomes equal to or higher than the reference voltage $V_{REF}$ and the voltage reduction detection signal Vd enters the low level.

Then, at a timing T2 at which the ON time $t_{pON}$ exemplified in Equation 1 elapses from the timing T1, the PMOS OFF timing detection unit 230 outputs the PMOS OFF timing detection signal $P_{end}$. When the PMOS OFF timing detection signal $P_{end}$ is output, the converter control unit 220 controls the PMOS control signal Pon such that the PMOS control signal Pon enters the low level and controls the NMOS control signal Non such that the NMOS control signal Non enters the high level. The PMOS control signal Pon with the low level causes the P type MOS transistor 261 to transition to the OFF state, and thus the supply of the current to the coil 270 ends.

Also, during a period in which the PMOS control signal Pon is at the high level, the PMOS OFF timing detection unit 230 is controlled such that the PMOS OFF timing detection unit 230 enters an enabled state. During a period in which the PMOS control signal Pon is at the low level, the PMOS OFF timing detection unit 230 is controlled such that the PMOS OFF timing detection unit 230 enters a disabled state. A diagonal line portion in FIG. 9 indicates a period in which the PMOS OFF timing detection unit 230 is enabled.

Then, until the mask period tz elapses from the timing T2, the NMOS OFF timing detection signal $N_{end}$ is masked. At a timing T3 at which the mask period tz elapses, the detection signal mask unit 243 controls the mask period control signal ZBT such that the mask period control signal ZBT enters the high level.

Subsequently, when the current $I_{L2}$ is reduced to a value equal to or less than "0" milliamperes (mA), the NMOS OFF timing detection unit 240 outputs the NMOS OFF timing detection signal $N_{end}$. When the NMOS OFF timing detection signal $N_{end}$ is output, the converter control unit 220 controls the NMOS control signal Non such that the NMOS control signal Non enters the low level. The NMOS control signal Non with the low level causes the N type MOS transistor 262 to transition to the OFF state, and thus backward flow of the current is prevented.

Also, during a period in which the NMOS control signal Non is at the high period, the NMOS OFF timing detection unit 240 is controlled such that the NMOS OFF timing detection unit 240 enters an enabled state. During a period in which the NMOS control signal Non is at the low level, the NMOS OFF timing detection unit 240 is controlled such that the NMOS OFF timing detection unit 240 enters a disabled state. A grey portion in FIG. 9 indicates a period in which the NMOS OFF timing detection unit 240 is enabled. In addition, a circuit (the converter control unit 220 or the like) other than the PMOS OFF timing detection unit 230 and the NMOS OFF timing detection unit 240 normally operates during a period of the converter enable signal EN is enabled.

Then, at a timing T5 at which the output voltage Vo is lower than the reference voltage $V_{REF}$ again, the voltage reduction detection unit 210 outputs the voltage reduction detection signal Vd with the high level and performs switching control of the MOS transistors (261 and 262).

In this way, over a period from the start timing (T1) of the current supply to the end timing (T2) of the current supply, the converter control unit 220 enables the PMOS OFF timing detection unit 230. During other periods, the converter control unit 220 disables the PMOS OFF timing detection unit 230. Also, over a period from the end timing (T2) to a timing (T4) at which the zero current is detected, the converter control unit 220 enables the NMOS OFF timing detection unit 240. During other periods, the converter control unit 220 disables the NMOS OFF timing detection unit 240. In this way, the converter control unit 220 intermittently controls the PMOS OFF timing detection unit 230 and the NMOS OFF timing detection unit 240. Therefore, power consumption of the DC-DC converter 200 can be reduced further than in a circuit that enables the detection units normally during the switching control of the detection units (230 and 240), as in Non-Patent Literature 1 or the like.

Next, calculation of current consumption is attempted when intermittent control is performed and when the intermittent control is not performed. For example, a program calculating current consumption is prepared and all the following conditions are input.

Power voltage $V_{DD}$=3.6 (V)

Output voltage Vo=1.8 (V)

Inductance L=2.20E-06 (H)

Peak current $k_{Lpk}$=300 (mA)

Further, when a load current Io is input, the program can calculate the ON=times $t_{pON}$ and $t_{noN}$, the switching frequency $f_{SW}$, and the switching period $T_{sw}$ using Equations 1 to 3 from the input values. Also, from these parameters, a duty ratio $D_{pON}$ of the P type MOS transistor 261, a duty ratio $D_{nON}$ of the N type MOS transistor 262, and an idle period $T_{idle}$ are calculated by the following equations.

$$D_{pON}=t_{pON}/T_{sw}$$

$$D_{nON}=t_{nON}/T_{sw}$$

$$T_{idle}=T_{sw}-(T_{pON}+T_{nON})$$

Also, a duty ratio expressed in the following equation is calculated from the idle period $T_{idle}$ and the switching period $T_{sw}$ of the foregoing equations.

$$D_{idle}=T_{idle}/T_{sw}$$

Five patterns of the load currents Io are prepared. The above-described parameters calculated for the load currents Io are exemplified in the following Table 1.

TABLE 1

| Io (A) | $f_{sw}$ (Hz) | $T_{sw}$ (s) | $T_{pON}$ (s) | $T_{nON}$ (s) | $T_{idle}$ (s) | $D_{pON}$ (%) | $D_{nON}$ (%) | $D_{idel}$ (%) |
|---|---|---|---|---|---|---|---|---|
| 1.00E−05 | 9.091.E+01 | 1.100.E−02 | 3.367.E−07 | 3.367.E−07 | 1.100.E−02 | 0.0033 | 0.0033 | 99.9933 |
| 1.00E−04 | 9.091.E+02 | 1.100.E−03 | 3.367.E−07 | 3.367.E−07 | 1.100.E−03 | 0.0333 | 0.0333 | 99.9333 |
| 1.00E−03 | 9.091.E+03 | 1.100.E−04 | 3.367.E−07 | 3.367.E−07 | 1.100.E−04 | 0.3333 | 0.3333 | 99.3333 |
| 1.00E−02 | 9.091.E+04 | 1.100.E−05 | 3.367.E−07 | 3.367.E−07 | 1.100.E−05 | 3.3333 | 3.3333 | 93.3333 |
| 1.00E−01 | 9.091.E+05 | 1.100.E−06 | 3.367.E−07 | 3.367.E−07 | 1.100.E−07 | 33.3333 | 33.3333 | 33.3333 |

Also, to obtain specific values of current consumption, for example, the following values are assumed to be input to the program as current consumption when the PMOS OFF timing detection unit 230 and the NMOS OFF timing detection unit 240 are not intermittently controlled.

Current consumption $I_{q\_VOD}$ of the voltage reduction detection unit 210: 2.0(%)

Current consumption $I_{q\_AOT}$ of the PMOS OFF timing detection unit 230: 48.0(%)

Current consumption $I_{q\_ZCD}$ of the NMOS OFF timing detection unit 240: 48.0(%)

Current consumption $I_{q\_Others}$ of other circuits: 2.0(%)

Here, the current consumption of the above-described units is represented by relative values when the current consumption Icc_cont of the control circuit is assumed to be 100. Here, control circuits are all the circuit excluding the coil 270 and the transistors (261 and 262) among the circuits inside the DC-DC converter 200. That is, all the circuits such as the voltage reduction detection unit 210, the converter control unit 220, the PMOS OFF timing detection unit 230, the NMOS OFF timing detection unit 240, and the like correspond to the control circuits. Accordingly, the current consumption $I_{cc\_cont}$ of the control circuits inside the DC-DC converter 200 is represented by the following equation.

$$I_{cc\_cont} = I_{q\_VOD} + I_{q\_AOT} + I_{q\_ZCD} + I_{q\_Others}$$

When the PMOS OFF timing detection unit 230 performs intermittent control, the current consumption $I_{cc\_AOT}$ is obtained by the following equation.

$$I_{cc\_AOT} = I_{q\_AOT} \times D_{pON}$$

Also, when the NMOS OFF timing detection unit 240 performs intermittent control, the current consumption $I_{cc\_ZCD}$ is obtained by the following equation.

$$I_{cc\_ZCD} = I_{q\_ZCD} \times D_{nON}$$

Accordingly, when the intermittent control is performed, current consumption $I_{cc\_int}$ of the control circuits is represented by the following equation.

$$I_{cc\_int} = I_{q\_VOD} + I_{q\_AOT} + I_{cc\_ZCD} + I_{q\_Others}$$

Results obtained by calculating the current consumption when the intermittent control is not performed and when the intermittent control are performed using the equations are exemplified in the following Table 2.

TABLE 2

| | Not inter-mittent | Intermittent | | |
|---|---|---|---|---|
| | | Io = 100 mA | Io = 1 mA | Io = 10 μA |
| Current consumption of voltage reduction detection unit | 2.0 | 2.0 | 2.00 | 2.0000 |
| Current consumption of PMOS OFF timing detection unit | 48.0 | 16.0 | 0.16 | 0.0016 |
| Current consumption of NMOS OFF timing detection unit | 48.0 | 16.0 | 0.16 | 0.0016 |
| Other current consumption | 2.0 | 2.0 | 2.00 | 2.0000 |
| Current consumption of control circuit | 100.0 | 36.0 | 4.32 | 4.0032 |

Figure 10:
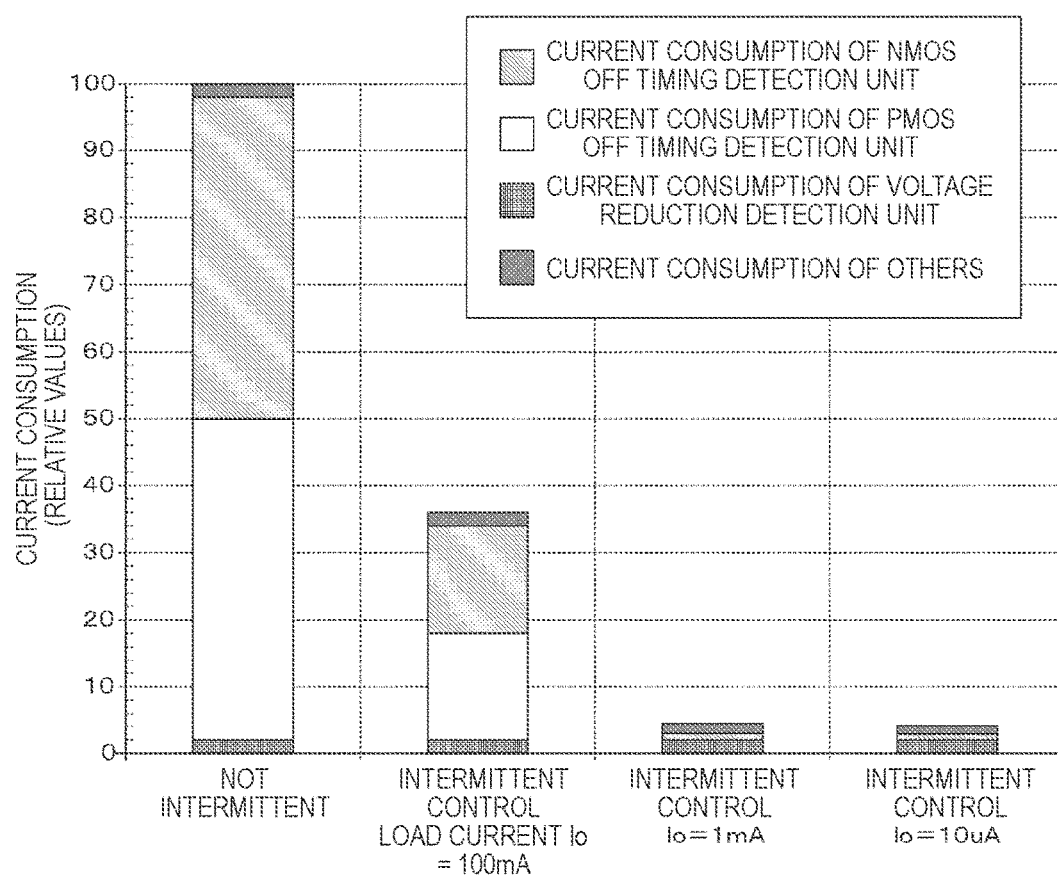
FIG. 10 is a diagram illustrating an example of power consumption of the DC-DC converter according to the first embodiment.

FIG. 10 is a diagram illustrating current consumption of the DC-DC converter 200 exemplified in Table 2. In the drawing, the vertical axis represents current consumption and the horizontal axis represents calculation conditions. As exemplified in the drawing, the current consumption of each circuit is an integrated value of current consumption during an operation period of the circuit. Therefore, through the intermittent control, the current consumption can be considerably reduced in accordance with the load current Io. For example, when the intermittent control is performed under the condition of a load current of 1 milliampere (mA), current consumption of the control circuit is 4.32(%). That is, through the intermittent control, the current consumption can be reduced by 95.7% compared to the case in which the intermittent control is not performed. Also, as a load becomes lighter, a ratio of an intermittent pause time ($T_{sw}$-$t_{pON}$-$t_{nON}$) to the switching period $T_{sw}$ increases. Therefore, it is possible to improve an effect of reducing the current consumption of the control circuit and improve power conversion efficiency. For example, when a load current Io is 100 milliamperes (mA), the current consumption of the control circuit is 36.0(%). On the other hand, when the load current Io is 1 milliampere (mA), the current consumption of the control circuit is reduced to 4.32(%).

[Operation Example of DC-DC Converter]

Figure 11:
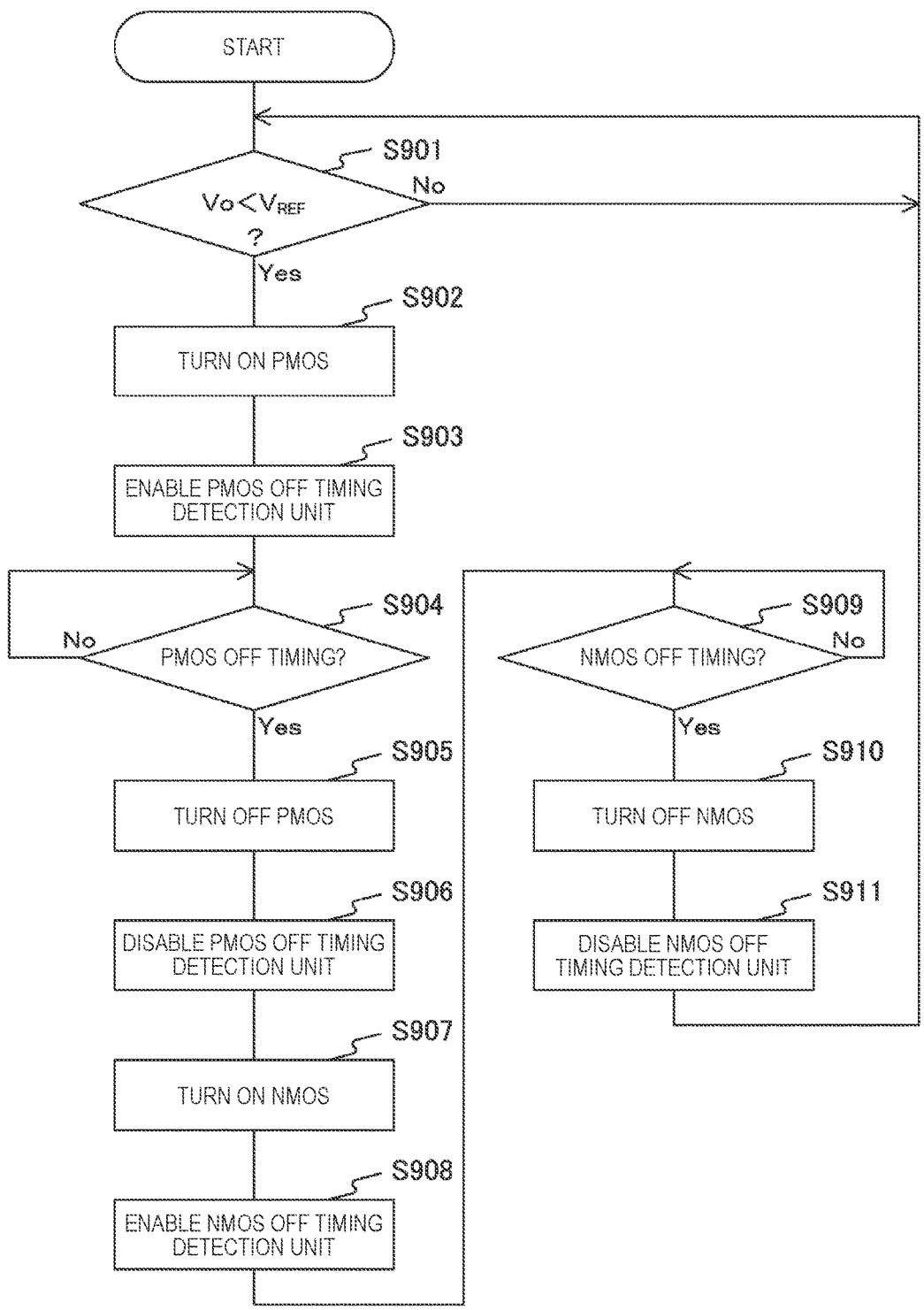
FIG. 11 is a flowchart illustrating an example of an operation of the DC-DC converter according to the first embodiment.

FIG. 11 is a flowchart illustrating an example of an operation of the DC-DC converter 200 according to the first embodiment. The operation is started, for example, when an enable state is set in the converter enable signal EN. The DC-DC converter 200 first determines whether the output voltage Vo is lower than the reference voltage $V_{REF}$ (step S901). When the output voltage Vo is lower than the reference voltage $V_{REF}$ (Yes in step S901), the DC-DC converter 200 sets the high level in the PMOS control signal Pon and sets the ON state in the P type MOS transistor 261 (step S902). Also, the DC-DC converter 200 controls the PMOS OFF timing detection unit 230 such that the PMOS OFF timing detection unit 230 enters the enabled state (step S903).

Then, the DC-DC converter 200 determines whether the PMOS OFF timing is detected (step S904). When the PMOS OFF timing is not detected (No in step S904), the DC-DC converter 200 returns the process to step S904.

When the PMOS OFF timing is detected (Yes in step S904), the DC-DC converter 200 sets the low level in the PMOS control signal Pon and sets the OFF state in the P type MOS transistor 261 (step S905). Also, the DC-DC converter 200 controls the PMOS OFF timing detection unit 230 such that the PMOS OFF timing detection unit 230 enters the disabled state (step S906). Then, the DC-DC converter 200 sets the high level in the NMOS control signal Non and sets the ON state in the N type MOS transistor 262 (step S907). Also, the DC-DC converter 200 controls the NMOS OFF timing detection unit 240 such that the NMOS OFF timing detection unit 240 enters the enabled state (step S908).

Then, the DC-DC converter 200 determines whether the NMOS OFF timing is detected (step S909). When the NMOS OFF timing is not detected (No in step S909), the DC-DC converter 200 returns the process to step S909.

When the NMOS OFF timing is detected (Yes in step S909), the DC-DC converter 200 sets the low level in the NMOS control signal Non and sets the OFF state in the N type MOS transistor 262 (step S910). Also, the DC-DC converter 200 controls the NMOS OFF timing detection unit 240 such that the NMOS OFF timing detection unit 240 enters the disabled state (step S911). When the output voltage Vo is equal to or higher than the reference voltage $V_{REF}$ (No in step S901) or after step S911, the DC-DC converter 200 returns the process to step S901.

In this way, in the first embodiment of the present technology, when a start timing is detected, the PMOS OFF timing control unit 230 starts an operation. When an end timing is detected, the converter control unit 220 stops the PMOS OFF timing detection unit 230. That is, during a period from the start timing to the end timing, the PMOS OFF timing detection unit 230 operates. During other periods, the PMOS OFF timing detection unit 230 stops. Therefore, it is possible to suppress the power consumption of the entire DC-DC converter 200.

2. Second Embodiment

In the above-described first embodiment, the switching control is performed immediately after the activation of the DC-DC converter 200. However, immediately after the activation, there is a concern that an analog circuit (for example, the PMO OFF timing detection unit 230) performing the intermittent operation may erroneously operate. When an erroneous operation occurs in the PMO OFF timing detection unit 230 or the like, there is a possibility of a problem such as an overcurrent or backward flow of an inductor current or an abnormality of an output voltage occurring. Therefore, during a certain preparation period $t_{SU}$ from activation, it is desirable to enable all the circuits inside the DC-DC converter 200 and flow a bias current. A DC-DC converter 200 according to a second embodiment is different from that of the first embodiment in that all the circuits inside the DC-DC converter 200 are controlled such that the circuits are in an enabled state over a certain period from activation.

Figure 12:
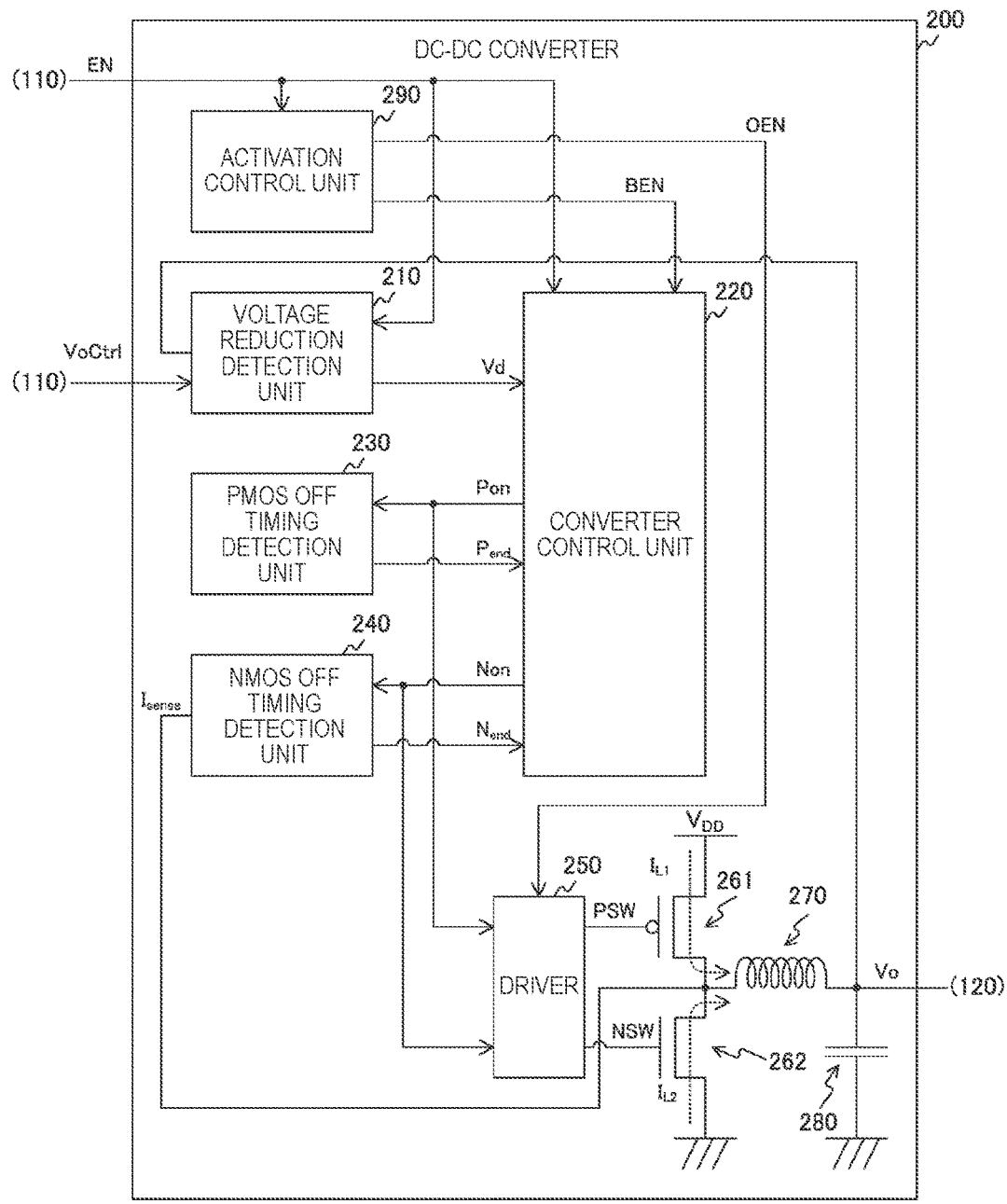
FIG. 12 is a block diagram illustrating a configuration example of a DC-DC converter according to a second embodiment.

FIG. 12 is a block diagram illustrating a configuration example of the DC-DC converter 200 according to the second embodiment. The DC-DC converter 200 according to the second embodiment is different from that of the first embodiment in that an activation control unit 290 is further included.

The activation control unit 290 controls all the circuits inside the DC-DC converter 200 such that the circuits enter the enabled state over a certain preparation period $t_{SU}$ from the activation. The activation control unit 290 disables an output of the driver 250 over a period in which the preparation period $t_{SU}$ elapses from the enabled state of the converter enable signal EN and generates an output enable signal OEN for enabling the circuits after elapse of the preparation period $t_{SU}$. For example, when the circuits are controlled such that the circuits enter the enabled state, a high level is set in the output enable signal OEN. When the circuits are controlled such that the circuits enter the disabled state, a low level is set in the output enable signal OEN.

Also, the activation control unit 290 generates an activation enable signal BEN for enabling the circuits over the preparation period $t_{SU}$ from the time of setting the converter enable signal EN to be enabled and disabling the circuits during a period other than the preparation period $t_{SU}$. For example, a high level is set in the activation enable signal BEN when the circuits are controlled such that the circuits enter the enabled state. A low level is set in the activation enable signal BEN when the circuits are controlled such that the circuits enter the disabled state. The activation control unit 290 supplies the activation enable signal BEN to the converter control unit 220 and supplies the output enable signal OEN to the driver 250.

The converter control unit 220 according to the second embodiment sets a high level (enable) in the PMOS control signal Pon and the NMOS control signal Non over a period (preparation period) in which the activation enable signal BEN is at the high level. After the preparation period elapses, the same switching control as that of the first embodiment is performed.

Also, when the output enable signal OEN is at the low level (disable), the driver 250 according to the second embodiment controls the P type MOS transistor 261 and the N type MOS transistor 262 such that P type MOS transistor 261 and the N type MOS transistor 262 enter an OFF state. Conversely, when the output enable signal OEN is at the high level (enable), the driver 250 turns the transistors on and off in accordance with the PMOS control signal Pon and the NMOS control signal Non as in the first embodiment.

Figures 13, 14:
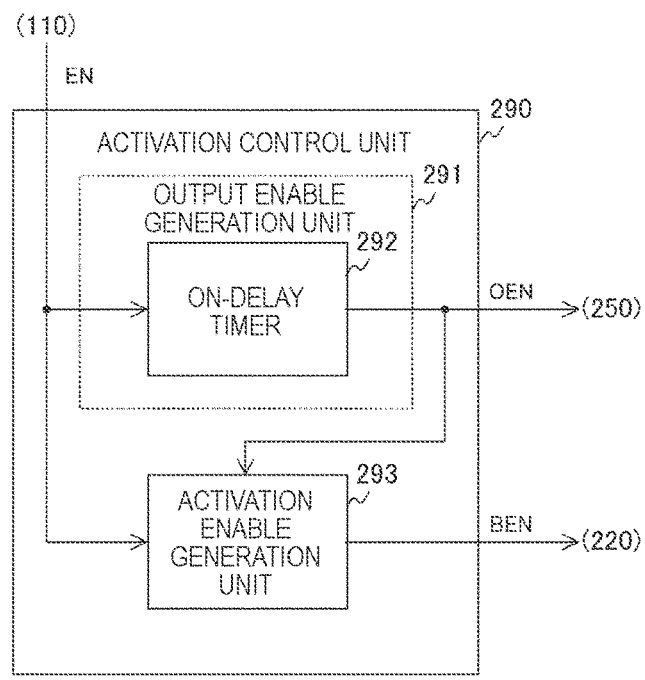
FIG. 13 is a block diagram illustrating a configuration example of an activation control unit according to the second embodiment.
FIG. 14 is a diagram illustrating an example of an operation of an activation enable generation unit according to the second embodiment.

FIG. 13 is a block diagram illustrating a configuration example of the activation control unit 290 according to the second embodiment. The activation control unit 290 includes an output enable generation unit 291 and an activation enable generation unit 293. The output enable generation unit 291 includes an on-delay timer 292.

The on-delay timer 292 generates a signal for delaying start of the converter enable signal EN over the preparation period $t_{SU}$ as the output enable signal OEN. The on-delay timer 292 supplies the output enable signal OEN to the driver 250 and the activation enable generation unit 293.

The activation enable generation unit 293 generates the activation enable signal BEN. For example, when the converter enable signal EN is at the high level and the output enable signal OEN is at the low level, the activation enable generation unit 293 sets the high level in the activation enable BEN. Otherwise, the activation enable generation unit 293 sets the low level in the activation enable signal BEN.

FIG. 14 is a diagram illustrating an example of an operation of the activation enable generation unit 293 according to the second embodiment. When both the converter enable signal EN and the output enable signal OEN are at the high level or both the converter enable signal EN and the output enable signal OEN are at the low level, the activation enable generation unit 293 sets the low level in the activation enable signal BEN. Also, when the converter enable signal EN is at the high level and the output enable signal OEN is at the low level, the activation enable generation unit 293 sets the high level in the activation enable signal BEN.

FIG. 15 is a diagram illustrating an example of an operation of controlling the P-type MOS transistor 261 of the converter control unit 220 according to the second embodiment. When the converter enable signal EN is at the low level (disable), the PMOS control signal is controlled such that the PMOS control signal enters the low level. Also, when both the converter enable signal En and the activation enable signal BEN are at the high level (enable), the high level is set in the PMOS control signal Pon. When the converter enable signal EN is at the high level and the activation enable signal BEN is at the low level, the same PMOS control signal Pon as that of the first embodiment is generated.

FIG. 16 is a diagram illustrating an example of an operation of controlling the N-type MOS transistor 262 of the converter control unit 220 according to the second embodiment. When the converter enable signal EN is at the low level (disable), the NMOS control signal Non is controlled such that the NMOS control signal Non enters the low level. Also, when both the converter enable signal EN and the activation enable signal BEN are at the high level (enable), the NMOS control signal Non is set to the high level. When the converter enable signal EN is at the high level and the activation enable signal BEN is at the low level, the same NMOS control signal Non as that of the first embodiment is generated.

Figure 17:
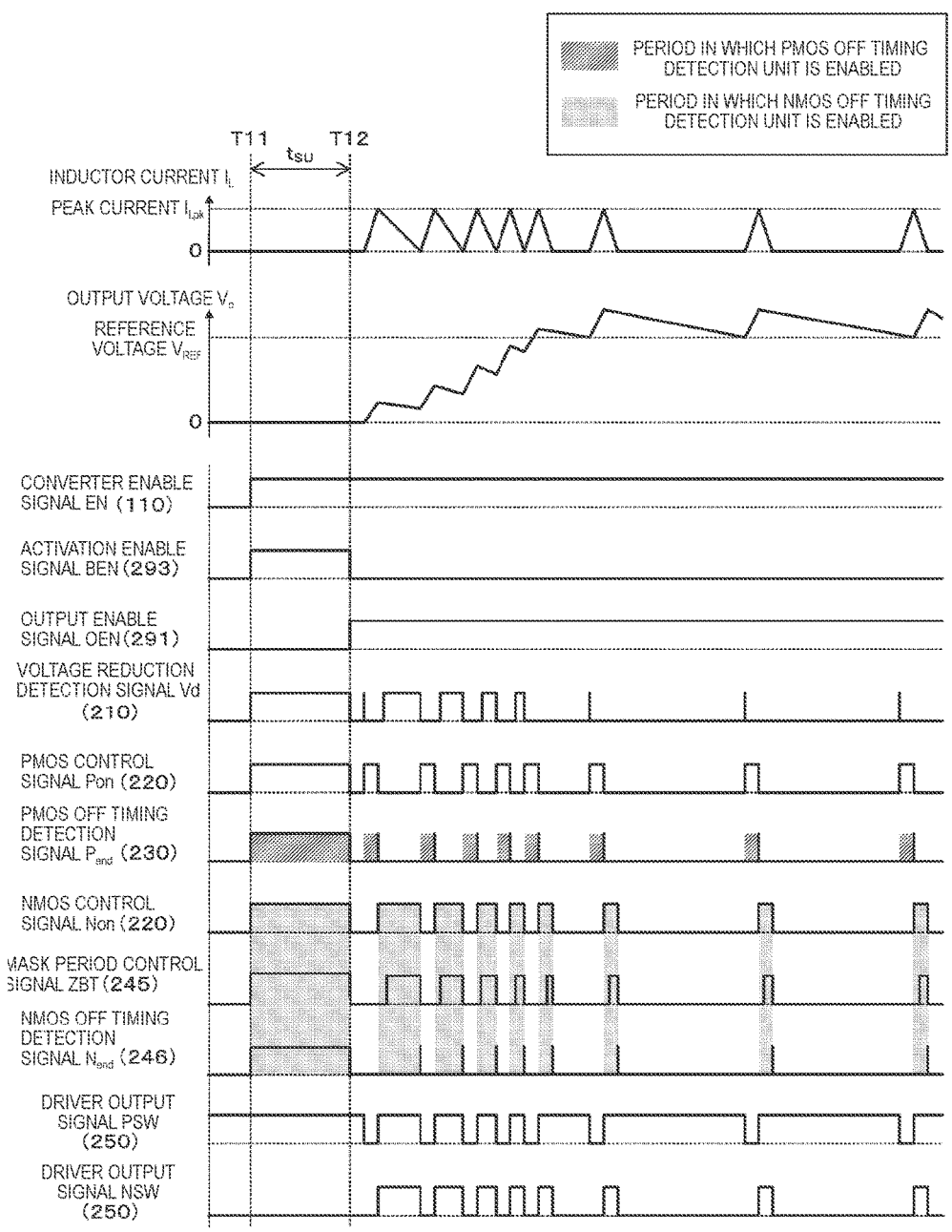
FIG. 17 is a timing chart illustrating an example of an operation of the DC-DC converter according to the second embodiment.

FIG. 17 is a timing chart illustrating an example of an operation of the DC-DC converter 200 according to the second embodiment. When the converter enable signal EN is set to the high level at a timing T11, the activation enable signal BEN is set to the high level until the certain preparation period $t_{SU}$ elapses. At a timing T12 at which the preparation period $t_{SU}$ elapses, the activation enable signal BEN is controlled such that the activation enable signal BEN enters the low level and the output enable signal OEN is controlled such that the output enable signal OEN enters the high level.

Over the preparation period $t_{SU}$ from the timing T11 to the timing T12, the DC-DC converter 200 flows a bias current to each circuit therein to operate the circuit. On the other hand, the driver 250 controls the P type MOS transistor 261 and the N type MOS transistor 262 such that the P type MOS transistor 261 and the N type MOS transistor 262 enter the OFF state. Then, after the timing T12, the same switching control as that of the first embodiment is performed.

During the preparation period $t_{SU}$, a sufficient time from a state in which all the analog circuits (the PMOS OFF timing detection unit 230 and the like) are stopped to a circuit state of an intermittent pause (idle period) is set. The reason why the preparation period is necessary is that the preparation period generally differs between a stop state and an intermittent pause state in an analog circuit state. For example, in the stop state, the circuits are reliably stopped and it is necessary to suppress current consumption to zero. The current consumption is suppressed during the intermittent pause, but a standby state in which an operation transitions to a normal operation in a considerably short time is necessary. In this way, while the preparation period is the same as the stop state and the pause state in that a circuit operation is stopped, the circuit internal state differs. Therefore, the preparation period $t_{SU}$ necessary on the basis of the difference in the state is provided.

In this way, according to the second embodiment of the present technology, an operation is performed without stopping each circuit of the PMOS OFF timing detection unit 230 and the like within the certain preparation period immediately after activation. Therefore, the DC-DC converter 200 can be stably activated.

3. Third Embodiment

In the above-described first embodiment, the comparison result of the comparator 212 is output as the voltage reduction detection signal Vd without change. However, in a circuit in which the power consumption of the comparator 212 is reduced, a delay time from a time at which the output voltage Vo increases to a voltage equal to or greater than $V_{REF}$ to inversion of the voltage reduction detection signal Vd may be longer in some cases. When the delay time is longer, circuits (the converter control unit 200 and the like) after the comparator 212 erroneously operate, and thus there is a concern of a problem occurring, such as deterioration in voltage conversion efficiency, an increase in a ripple voltage, or abnormality of an output overvoltage. After the P type MOS transistor 261 is controlled such that the P type MOS transistor 261 is turned on, the voltage reduction detection signal Vd is unnecessary. Therefore, during a period in which the PMOS control signal is at the high level, it is desirable to fix the voltage reduction detection signal Vd to the low level. Thus, it is possible to prevent an erroneous operation from occurring due to delay of the comparator 212. Unlike the first embodiment, the DC-DC converter 200 according to the third embodiment fixes the voltage reduction detection signal Vd to the low level during the period in which the PMOS control signal Pon is at the high level.

Figure 18:
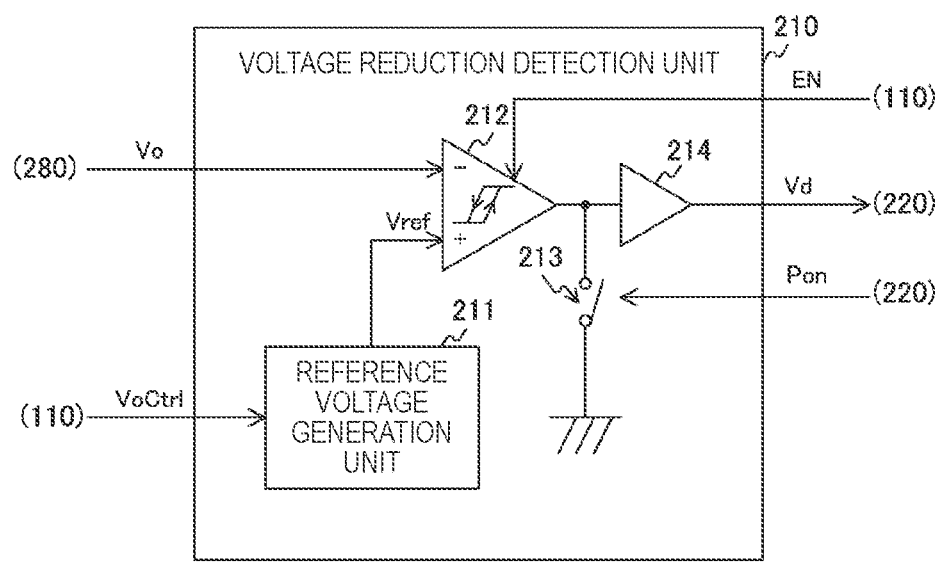
FIG. 18 is a block diagram illustrating a configuration example of a voltage reduction detection unit according to a third embodiment.

FIG. 18 is a block diagram illustrating a configuration example of the voltage reduction detection unit 210 according to the third embodiment. Unlike the first embodiment, the voltage reduction detection unit 210 further includes the switch 213 and the buffer 214. One end of the switch 213 is connected to an output terminal of the comparator 212 and an input terminal of the buffer 214 and the other end of the switch 213 is grounded. When the PMOS control signal Pon is at the high level, the switch 213 transitions to the closed state. When the PMOS control signal Pon is at the low level, the switch 213 transitions to the open state. Also, the output terminal of the buffer 214 is connected to the converter control unit 220.

In this configuration, the voltage reduction detection signal Vd is fixed to the low level during the period in which the PMOS control signal Pon is at the high level. When the PMOS control signal Pon enters the low level, the fixing of the low level is cancelled.

In addition, the switch 213 is controlled using the PMOS control signal Pon. However, separately from the PMOS control signal Pon, the converter control unit 220 may generate a signal for controlling the switch 213 such that the switch 123 enters the closed state over the ON time $t_{pON}$.

Figure 19:
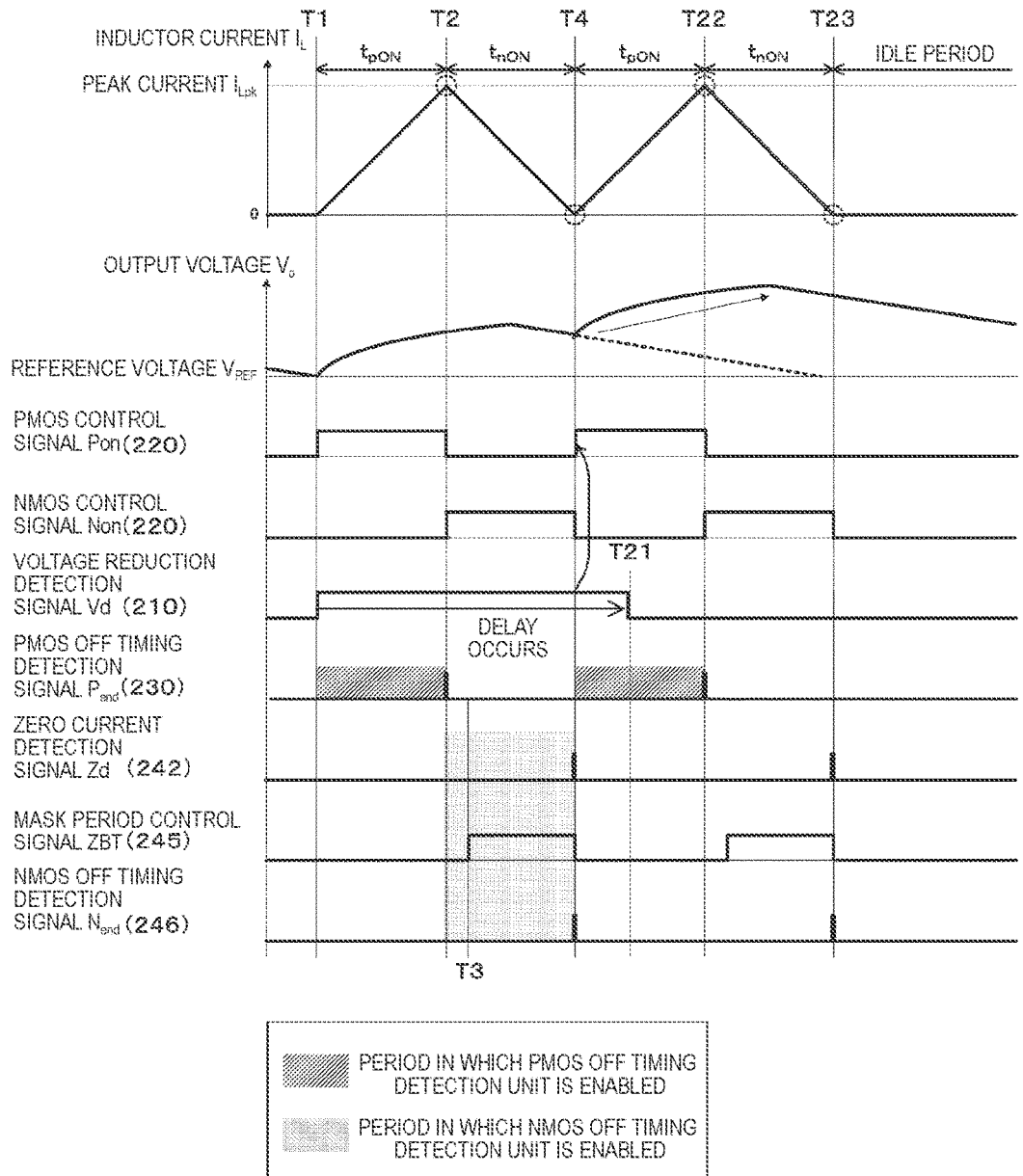
FIG. 19 is a timing chart illustrating an example of an operation of a DC-DC converter according to a comparative example of the third embodiment.

FIG. 19 is a timing chart illustrating an example of an operation of the DC-DC converter 200 according to a comparative example of the third embodiment. When the output voltage Vo is reduced to a voltage less than the reference voltage $V_{REF}$ at a timing T1, the comparator 212 generates the voltage reduction detection signal Vd with the high level. Then, the output voltage Vo is increased to a voltage equal to or greater than the reference voltage $V_{REF}$ after the timing T1, but a timing T21 at which the voltage reduction detection signal Vd is inverted to the low level is assumed to be considerably delayed with respect to a timing (immediately after T1) at which the output voltage Vo is equal to or greater than the reference voltage $V_{REF}$. For example, the timing T21 is assumed to be delayed after a timing T4 at which the N type MOS transistor 262 is controlled such that the N type MOS transistor 262 is turned off.

Here, in a configuration in which the switch 213 is not installed, the PMOS control signal Pon is controlled such that the PMOS control signal Pon enters the high level again without transitioning to an idle period at the timing T4. As a result, unnecessary switching may be performed and an erroneous operation occurs in a circuit.

In contrast, assuming a configuration in which the voltage reduction detection signal Vd is fixed to the low level when the PMOS control signal Pon is at the high level, it is possible to realize the same switching as that of FIG. 9 in the first embodiment. Accordingly, a reduction in the power consumption of the DC-DC converter 200 and a high-speed response can be compatible.

In this way, according to the third embodiment of the present technology, the voltage reduction detection signal Vd is fixed to the low level in the period in which the PMOS control signal Pon is at the high level. Therefore, it is possible to suppress an erroneous operation caused due to delay of the inversion timing of the voltage reduction detection signal Vd.

4. Fourth Embodiment

In the above-described first embodiment, the N type MOS transistor 262 is controlled such that the N type MOS transistor 262 enters the OFF state to prevent backward flow. However, a diode may be installed instead of the switching element to prevent backward flow. When the backward flow is prevented by the diode, power consumption is greater than when the NMOS transistor 262 is used. However, switching control of the transistor is unnecessary. Unlike the first embodiment, the DC-DC converter 200 according to a fourth embodiment includes a diode that prevents backward flow instead of the N type MOS transistor 262.

Figure 20:
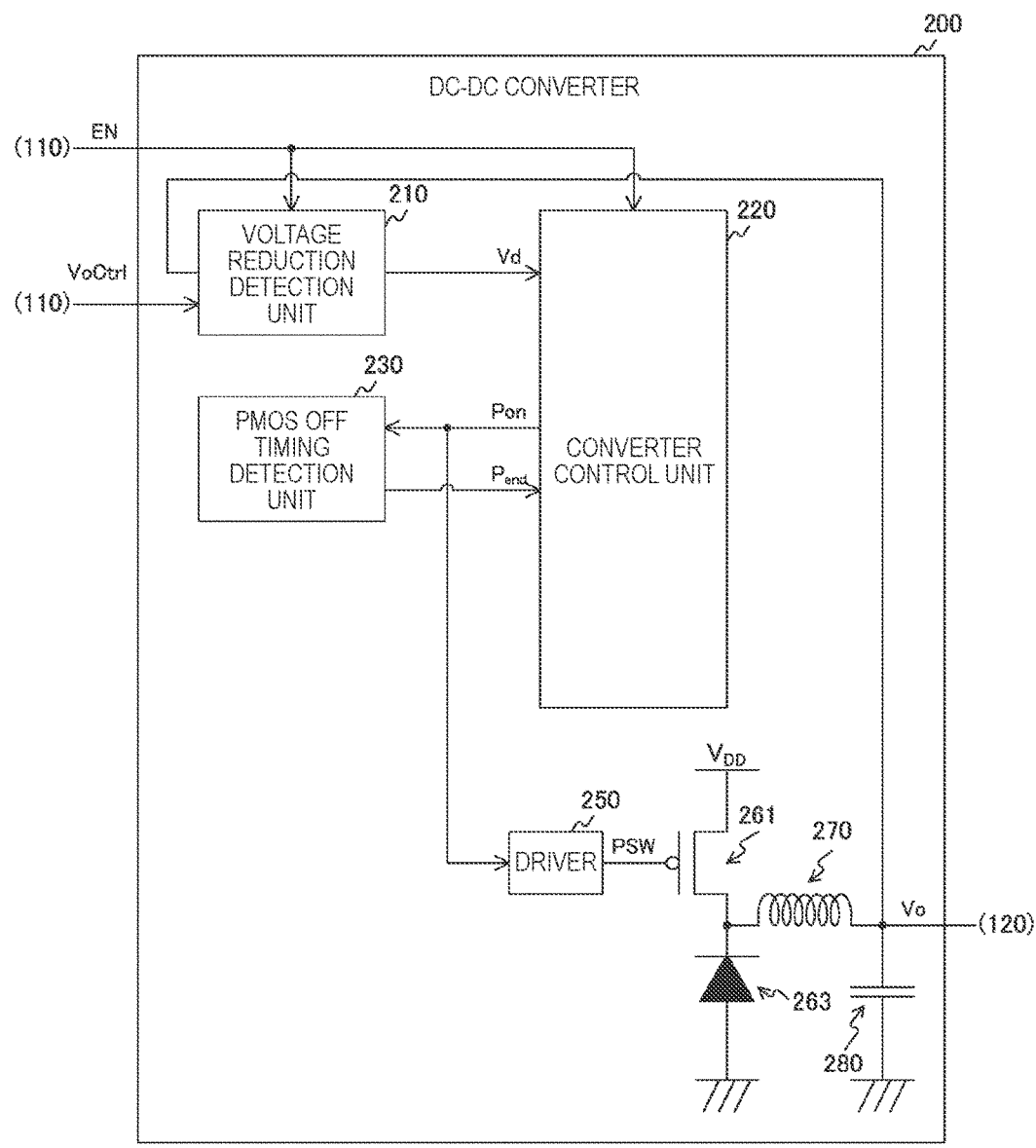
FIG. 20 is a block diagram illustrating a configuration example of a DC-DC converter according to a fourth embodiment.

FIG. 20 is a block diagram illustrating a configuration example of the DC-DC converter 200 according to the fourth embodiment. Unlike the first embodiment, the DC-DC converter 200 according to the fourth embodiment includes a diode 263 instead of the N type transistor 262 and does not include the NMOS OFF timing detection unit 240. Also, unlike the first embodiment, the converter control unit 220 according to the fourth embodiment does not include the NMOS control signal generation unit 222.

In the diode 263, an anode is grounded and a cathode is connected to the P type MOS transistor 261 and the coil 270. Since a current flows only in a direction from the anode to the cathode of the diode 263, backward flow of the current from the coil 270 is prevented by the diode 263.

In this way, according to the fourth embodiment of the present technology, the diode 263 is installed instead of the N type MOS transistor 262. Therefore, it is not necessary to perform the switching control of the N type MOS transistor 262. Thus, the converter control unit 220 can be realized with a simple configuration.

5. Fifth Embodiment

In the above-described first embodiment, the PMOS OFF timing is detected by the ON time timer 232. However, the current $I_{L1}$ supplied to the coil 270 is compared to the peak current $I_{Lpk}$ by the comparator. When the current $I_{L1}$ reaches $I_{Lpk}$, the current $I_{L1}$ may be detected as the PMOS OFF timing. Unlike the first embodiment, the DC-DC converter 200 according to the fifth embodiment compares the current $I_{L1}$ to the peak current $I_{Lpk}$ and the current $I_{L1}$ is detected as the PMOS OFF timing when the current $I_{L1}$ reaches $I_{Lpk}$.

Figure 21:
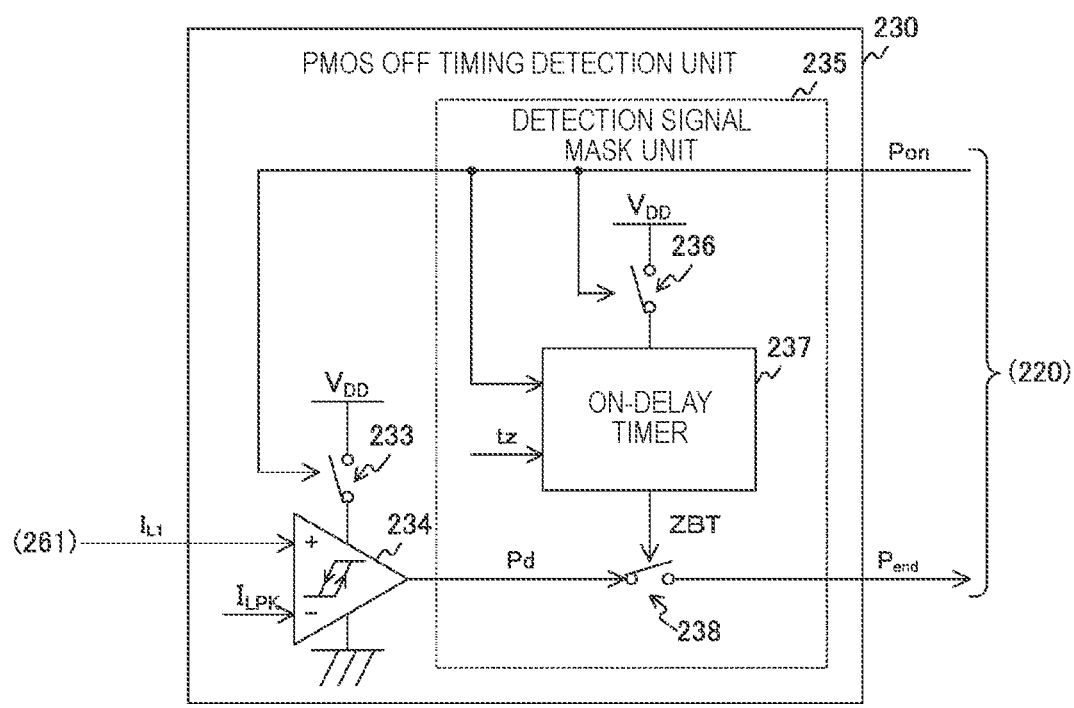
FIG. 21 is a block diagram illustrating a configuration example of a PMOS OFF timing detection unit according to a fifth embodiment.

FIG. 21 is a block diagram illustrating a configuration example of the PMOS OFF timing detection unit 230 according to the fifth embodiment. The fifth PMOS OFF timing detection unit 230 includes a switch 233, a comparator 234, and a detection signal mask unit 235. The detection signal mask unit 235 includes a switch 236, an on-delay timer 237, and a switch 238.

The switch 233 supplies the power voltage $V_{DD}$ to the comparator 234 in accordance with the PMOS control signal Pon. For example, the switch 233 supplies the power voltage $V_{DD}$ when the PMOS control signal Pon is at the high level. The switch 233 does not supply the power voltage $V_{DD}$ when the PMOS control signal Pon is at the low level.

The comparator 234 compares the current $I_{L1}$ supplied to the coil 270 to the peak current $I_{Lpk}$. The current $I_{L1}$ is input to a non-inversion input terminal (+) of the comparator 234 and the peak current $I_{Lpk}$ is input to an inversion input terminal (−) of the comparator 234. The comparator 234 supplies a result obtained by comparing the current $I_{L1}$ to the peak current $I_{Lpk}$ as the PMOS OFF timing detection signal $P_{end}$ to the switch 238.

The switch 236 supplies the power voltage $V_{DD}$ to the on-delay timer 237 in accordance with the PMOS control signal Pon. For example, the switch 236 supplies the power voltage $V_{DD}$ when the PMOS control signal Pon is at the high level. The switch 236 does not supply the power voltage $V_{DD}$ when the PMOS control signal Pon is at the low level.

The on-delay timer 237 supplies a signal obtained by delaying start of the PMOS control signal Pon over the certain mask period tz as the mask period control signal ZBT to the switch 238.

The switch 238 opens and closes a path between the comparator 234 and the converter control unit 220 in accordance with the mask period control signal ZBT. When the mask period control signal ZBT is at the high level, the switch 238 transitions to the closed state. When the mask period control signal ZBT is at the low level, the switch 238 transitions to an open state.

In addition, the switch 233 is installed outside of the comparator 234, but the switch 233 may be installed inside the comparator 234. The switch 236 may similarly be installed inside the on-delay timer 237. Also, when there is no concern of an erroneous operation or erroneous detection occurring immediately after the comparator 234 is enabled, the detection signal mask unit 235 may not be installed.

In this way, according to the fifth embodiment of the present technology, the current $I_{L1}$ is detected as the PMOS OFF timing when the current $I_{L1}$ reaches the peak current $I_{Lpk}$. Therefore, the DC-DC converter 200 can control the PMOS OFF timing using the comparator instead of a timer.

6. Sixth Embodiment

In the above-described first embodiment, the information processing device 100 includes one DC-DC converter and power is supplied to the processor 120. The processor 120 can stop supplying the power to an unnecessary circuit among internal circuits in accordance with an obtained calculation amount or process content, and thus it is possible to reduce the power consumption. However, when supply of power to all the circuits of the processor 120 is stopped, the processor 120 stops. Therefore, it is desirable to install a plurality of power supply systems (DC-DC converters or the like) and stop supplying only power from some of the systems. Unlike the first embodiment, the information processing device 100 according to the sixth embodiment includes the plurality of DC-DC converters.

Figure 22:
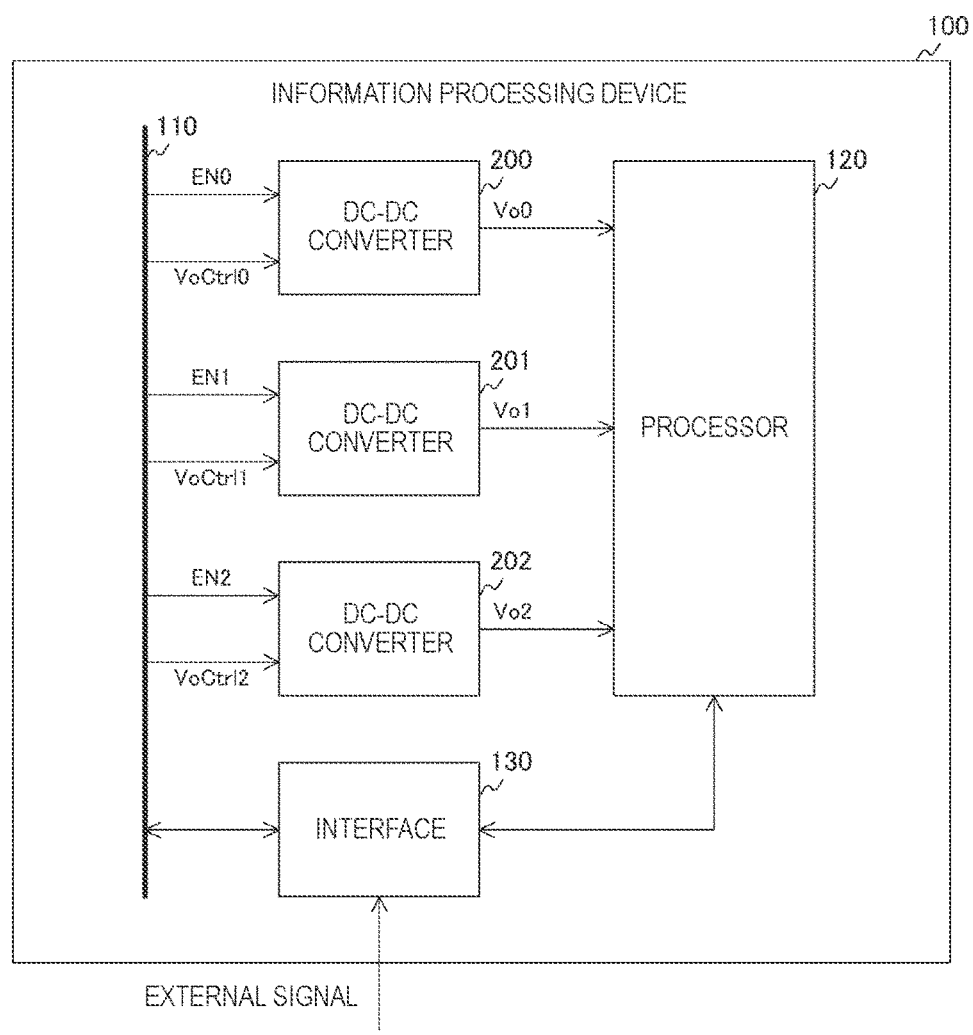
FIG. 22 is a block diagram illustrating a configuration example of an information processing device according to a sixth embodiment.

FIG. 22 is a block diagram illustrating a configuration example of the information processing device 100 according to the sixth embodiment. Unlike the first embodiment, the information processing device 100 according to the sixth embodiment further include DC-DC converters 201 and 202.

The configurations of the DC-DC converters 201 and 202 are the same as that of the DC-DC converter 200. Here, different converter enable signals and voltage control signals are input to the DC-DC converters 200, 201, and 202. For example, a converter enable signal EN0 and a voltage control signal VoCtrl0 are input to the DC-DC converter 200, and a converter enable signal EN1 and a voltage control signal VoCtrl1 are input to the DC-DC converter 201. Also, a converter enable signal EN2 and a voltage control signal VoCtrl2 are input to the DC-DC converter 202.

The DC-DC converters 200 to 202 can convert voltages with high conversion efficiency through the above-described intermittent control. Therefore, these converters can be used as power supplies of the processor 120 to reduce power consumption of the entire information processing device 100. When the DC-DC converters 200 to 202 perform the PFM control, conversion efficiency is improved particularly with a light load. Therefore, an advantageous effect of reducing the power consumption increases.

The processor 120 according to the sixth embodiment stops the DC-DC converter (200, 201, or 202) that supplies power to an unnecessary circuit among the internal circuits in accordance with an obtained calculation amount or process content.

In this way, according to the sixth embodiment of the present technology, the plurality of DC-DC converters are installed. Therefore, the processor 120 can reduce the power consumption by stopping some of the DC-DC converters.

In addition, the above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Further, the processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

In addition, the effects described in the present specification are not limiting but are merely examples, and there may be effects other than the ones described in the present specification.

Additionally, the present technology may also be configured as below.

(1)

A voltage conversion circuit including:

a voltage generation unit configured to generate an output voltage on the basis of a current when the current is supplied;

a stop control unit configured to output a signal for stopping the supply of the current;

a current supply unit configured to supply the current to the voltage generation unit until the signal is output; and an intermittent control unit configured to operate the stop control unit during a supply period of the current and to stop the stop control unit when the signal is output.

(2)

The voltage conversion circuit according to (1), further including:

a start timing detection unit configured to detect a start timing of the supply period, in which the stop control unit detects an end timing of the supply period and outputs the signal.

(3)

The voltage conversion circuit according to (2), in which the start timing detection unit includes a voltage comparator that compares the output voltage to a predetermined reference voltage and outputs a comparison result as a start timing detection signal, and a detection signal control unit that fixes the comparison result to a predetermined fixed value until the starting timing is detected and the end timing is detected.

(4)

The voltage conversion circuit according to (2) or (3), in which the stop control unit detects a time at which a predetermined period has elapsed from the start timing as the end timing.

(5)

The voltage conversion circuit according to (2) or (3), in which the stop control unit detects a time at which the current reaches a predetermined peak value as the end timing.

(6)

The voltage conversion circuit according to (5), in which the stop control unit includes a current comparator that compares the current to the predetermined peak value and outputs a comparison result as the signal, and a signal mask unit that masks the signal until a certain mask period elapses from the start timing.

(7)

The voltage conversion circuit according to any one of (1) to (6), further including:

a backward flow prevention unit configured to prevent backward flow of the current.

(8)

The voltage conversion circuit according to (7), further including:

a current reduction timing detection unit configured to start detecting a current reduction timing at which the current is lower than a predetermined set value when the signal is output, in which the backward flow prevention unit controls a path between the voltage generation unit and a ground terminal to a closed state when the signal is output, and the backward flow prevention unit controls the path to an open state when the current reduction timing is detected, and the intermittent control unit controls the current reduction timing detection unit such that the detection of the current reduction timing is stopped when the current reduction timing is detected.

(9)

The voltage conversion circuit according to any one of (1) to (8), further including:

an activation control unit configured to control and operate the stop control unit over a predetermined preparation period after an instruction to start generating the output voltage is given.

(10)

An electronic device including:

a voltage conversion circuit configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit that operates the stop control unit during a supply period of the current and stops the stop control unit when the signal is output; and a processing circuit configured to perform a process of controlling the output voltage.

(11)

An electronic device including:

a plurality of voltage conversion circuits each configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit an intermittent control unit that operates the stop control unit during a supply period of the current and stops the stop control unit when the signal is output; and a processing circuit configured to perform a process of controlling the output voltage of each of the plurality of voltage conversion circuits.

(12)

A method of controlling a voltage conversion circuit, the method including:

a stop control procedure of outputting, by a stop control unit, a signal for stopping supply of a current to a voltage generation unit that generates an output voltage on the basis of the current when the current is supplied;

a current supply procedure of supplying, by a current supply unit, the current to the voltage generation unit until the signal is output; and an intermittent control procedure of operating, by the intermittent control unit, the stop control unit during a supply period of the current and stopping the stop control unit when the signal is output.

REFERENCE SIGNS LIST 100 information processing device
110 bus
120 processor
130 interface
200, 201, 202 DC-DC converter
210 voltage reduction detection unit
211 reference voltage generation unit
212, 234, 242 comparator
213, 231, 233, 236, 238, 241, 244, 246 switch
214 buffer
220 converter control unit
221 PMOS control signal generation unit
222 NMOS control signal generation unit
230 PMOS OFF timing detection unit
232 ON time timer
235, 243 detection signal mask unit
237, 245, 292 on-delay timer
240 NMOS OFF timing detection unit
250 driver
261 P type MOS transistor
262 N type MOS transistor
263 diode
270 coil
280 capacitor
290 activation control unit
291 output enable generation unit
293 activation enable generation unit

The invention claimed is:

1. A voltage conversion circuit comprising:
a voltage generation unit configured to generate an output voltage on the basis of a current when the current is supplied;
a stop control unit configured to output a signal for stopping the supply of the current;
a current supply unit configured to supply the current to the voltage generation unit until the signal is output; and
an intermittent control unit configured to operate the stop control unit during a supply period of the current and to stop the stop control unit when the signal is output,
wherein the stop control unit includes
a current comparator that compares the current to a predetermined peak value and outputs a comparison result as the signal, and
a signal mask unit that receives the signal from the current comparator and interrupts the signal until a mask period elapses from a start timing of the supply period.

2. The voltage conversion circuit according to claim 1, further comprising:
a start timing detection unit configured to detect the start timing of the supply period,
wherein the stop control unit detects an end timing of the supply period and outputs the signal.

3. The voltage conversion circuit according to claim 2, wherein the start timing detection unit includes
a voltage comparator that compares the output voltage to a predetermined reference voltage and outputs a comparison result as a start timing detection signal, and
a detection signal control unit that fixes the comparison result to a predetermined fixed value until the starting timing is detected and the end timing is detected.

4. The voltage conversion circuit according to claim 2, wherein the stop control unit detects a time at which a predetermined period has elapsed from the start timing as the end timing.

5. The voltage conversion circuit according to claim 2, wherein the stop control unit detects a time at which the current reaches the predetermined peak value as the end timing.

6. The voltage conversion circuit according to claim 1, further comprising:
a backward flow prevention unit configured to prevent backward flow of the current.

7. The voltage conversion circuit according to claim 6, further comprising:

a current reduction timing detection unit configured to start detecting a current reduction timing at which the current is lower than a predetermined set value when the signal is output,
wherein the backward flow prevention unit controls a path between the voltage generation unit and a ground terminal to a closed state when the signal is output, and the backward flow prevention unit controls the path to an open state when the current reduction timing is detected, and
the intermittent control unit controls the current reduction timing detection unit such that the detection of the current reduction timing is stopped when the current reduction timing is detected.

8. The voltage conversion circuit according to claim 1, further comprising:
an activation control unit configured to control and operate the stop control unit over a predetermined preparation period after an instruction to start generating the output voltage is given.

9. An electronic device comprising:
a voltage conversion circuit configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit that operates the stop control unit during a supply period of the current and stops the stop control unit when the signal is output,
wherein the stop control unit includes
a current comparator that compares the current to a predetermined peak value and outputs a comparison result as the signal, and
a signal mask unit that receives the signal from the current comparator and interrupts the signal until a mask period elapses from a start timing of the supply period; and
a processing circuit configured to perform a process of controlling the output voltage.

10. The electronic device according to claim 9, further comprising:
a start timing detection unit configured to detect the start timing of the supply period,
wherein the stop control unit detects an end timing of the supply period and outputs the signal.

11. The electronic device according to claim 10,
wherein the start timing detection unit includes
a voltage comparator that compares the output voltage to a predetermined reference voltage and outputs a comparison result as a start timing detection signal, and
a detection signal control unit that fixes the comparison result to a predetermined fixed value until the starting timing is detected and the end timing is detected.

12. The electronic device according to claim 10,
wherein the stop control unit detects a time at which a predetermined period has elapsed from the start timing as the end timing.

13. The electronic device according to claim 10,
wherein the stop control unit detects a time at which the current reaches the predetermined peak value as the end timing.

14. The electronic device according to claim 9, further comprising:
a backward flow prevention unit configured to prevent backward flow of the current.

15. The electronic device according to claim 14, further comprising:
a current reduction timing detection unit configured to start detecting a current reduction timing at which the current is lower than a predetermined set value when the signal is output,
wherein the backward flow prevention unit controls a path between the voltage generation unit and a ground terminal to a closed state when the signal is output, and the backward flow prevention unit controls the path to an open state when the current reduction timing is detected, and
the intermittent control unit controls the current reduction timing detection unit such that the detection of the current reduction timing is stopped when the current reduction timing is detected.

16. The electronic device according to claim 9, further comprising:
an activation control unit configured to control and operate the stop control unit over a predetermined preparation period after an instruction to start generating the output voltage is given.

17. An electronic device comprising:
a plurality of voltage conversion circuits each configured to include a voltage generation unit that generates an output voltage on the basis of a current when the current is supplied, a stop control unit that outputs a signal for stopping the supply of the current, a current supply unit that supplies the current to the voltage generation unit until the signal is output, and an intermittent control unit an intermittent control unit that operates the stop control unit during a supply period of the current and stops the stop control unit when the signal is output,
wherein the stop control unit includes
a current comparator that compares the current to a predetermined peak value and outputs a comparison result as the signal, and
a signal mask unit that receives the signal from the current comparator and interrupts the signal until a mask period elapses from a start timing of the supply period; and
a processing circuit configured to perform a process of controlling the output voltage of each of the plurality of voltage conversion circuits.

18. A method of controlling a voltage conversion circuit, the method comprising:
a stop control procedure of outputting, by a stop control unit, a signal for stopping supply of a current to a voltage generation unit that generates an output voltage on the basis of the current when the current is supplied;
a current supply procedure of supplying, by a current supply unit, the current to the voltage generation unit until the signal is output; and
an intermittent control procedure of operating, by the intermittent control unit, the stop control unit during a supply period of the current and stopping the stop control unit when the signal is output,
wherein the stop control procedure includes
comparing, by a current comparator, the current to a predetermined peak value and outputs a comparison result as the signal, and
receiving, by a signal mask unit, the signal from the current comparator and interrupting the signal until a mask period elapses from a start timing of the supply period.

* * * * *